US012466667B2

(12) United States Patent
Komoda et al.

(10) Patent No.: US 12,466,667 B2
(45) Date of Patent: Nov. 11, 2025

(54) HANDLING SYSTEM, TRANSPORT SYSTEM, CONTROL DEVICE, STORAGE MEDIUM, AND HANDLING METHOD

(71) Applicant: Kabushiki Kaisha Toshiba, Tokyo (JP)

(72) Inventors: Kazuma Komoda, Kawasaki (JP); Seiji Tokura, Kawasaki (JP); Haruna Eto, Kawasaki (JP); Akihito Ogawa, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 465 days.

(21) Appl. No.: 17/830,687

(22) Filed: Jun. 2, 2022

(65) Prior Publication Data

US 2022/0388787 A1 Dec. 8, 2022

(30) Foreign Application Priority Data

Jun. 4, 2021 (JP) .................................. 2021-094490

(51) Int. Cl.
*B65G 47/90* (2006.01)
(52) U.S. Cl.
CPC .................................. *B65G 47/905* (2013.01)
(58) Field of Classification Search
CPC ..... B65G 47/905; B25J 9/1669; B25J 9/1679; B25J 9/1697; B25J 9/1612;

(Continued)

(56) References Cited

U.S. PATENT DOCUMENTS

2012/0215350 A1* 8/2012 Murayama ............. B25J 9/1697
901/31
2015/0127162 A1* 5/2015 Gotou .................... B25J 9/1612
700/259

(Continued)

FOREIGN PATENT DOCUMENTS

CN        109598264 A        4/2019
CN        109986560 A        7/2019

(Continued)

OTHER PUBLICATIONS

KR-102796802-B1 translation (Year: 2025).*

(Continued)

*Primary Examiner* — Kyle T Johnson
(74) *Attorney, Agent, or Firm* — Oblon, McClelland, Maier & Neustadt, L.L.P.

(57) ABSTRACT

According to an embodiment, there is provided a handling system capable of handling a plurality of objects, the handling system including: a movable arm, a holder, a sensor, and a controller. The holder is attached to the movable arm and is capable of holding the object. The sensor is capable of detecting the object. The controller controls the movable arm and the holder. The controller determines whether or not to change an arrangement of the object before the object is held, on the basis of information acquired from the sensor. In a case where it is determined to change the arrangement of the object, the controller evaluates effectiveness of an arrangement change operation for each object, and decides on an arrangement change operation on the basis of an evaluation result.

18 Claims, 10 Drawing Sheets

(58) Field of Classification Search
CPC .......... G05B 2219/37555; G05B 2219/39508; G05B 2219/39543; G05B 2219/40053; G05B 2219/45063

See application file for complete search history.

(56) References Cited

U.S. PATENT DOCUMENTS

| | | | |
|---|---|---|---|
| 2015/0224650 A1* | 8/2015 | Xu | B25J 9/1692 |
| | | | 414/730 |
| 2016/0167228 A1* | 6/2016 | Wellman | B25J 9/1602 |
| | | | 901/3 |
| 2017/0106532 A1 | 4/2017 | Wellman et al. | |
| 2018/0053144 A1* | 2/2018 | Wellman | B65G 47/90 |
| 2019/0070734 A1* | 3/2019 | Wertenberger | B25J 15/0616 |
| 2019/0168396 A1* | 6/2019 | Leidenfrost | B25J 9/1697 |
| 2019/0291277 A1* | 9/2019 | Oleynik | B25J 9/1669 |
| 2019/0308320 A1* | 10/2019 | Konishi | G06V 20/64 |
| 2020/0311956 A1* | 10/2020 | Choi | G06V 10/454 |
| 2020/0368923 A1* | 11/2020 | Tsukui | G05B 19/4183 |
| 2021/0069903 A1* | 3/2021 | Duan | G06N 3/08 |
| 2021/0078811 A1 | 3/2021 | Komoda et al. | |
| 2021/0122586 A1* | 4/2021 | Sun | B65G 47/917 |
| 2021/0291378 A1 | 9/2021 | Komoda et al. | |
| 2022/0274252 A1* | 9/2022 | Komoda | B25J 15/0052 |
| 2022/0388787 A1* | 12/2022 | Komoda | B25J 9/1669 |
| 2023/0150777 A1* | 5/2023 | Skyum | B07C 5/02 |
| | | | 700/245 |
| 2023/0182293 A1* | 6/2023 | Shaw | B25J 15/0616 |
| | | | 700/245 |
| 2024/0058971 A1* | 2/2024 | Guo | B25J 15/083 |

FOREIGN PATENT DOCUMENTS

| | | | | |
|---|---|---|---|---|
| EP | 2 364 823 A3 | 6/2011 | | |
| EP | 2 364 823 A2 | 9/2011 | | |
| EP | 3 575 043 A2 | 12/2019 | | |
| EP | 3 575 043 A3 | 3/2020 | | |
| EP | 3 617 936 A1 | 3/2020 | | |
| EP | 3753686 A1 * | 12/2020 | .............. | B07C 5/24 |
| JP | 3925020 B2 | 6/2007 | | |
| JP | 5533727 B2 | 6/2014 | | |
| JP | 2014-210310 A | 11/2014 | | |
| JP | 6016716 B2 | 10/2016 | | |
| JP | 2020-032523 A | 3/2020 | | |
| JP | 2020-189356 A | 11/2020 | | |
| JP | 2021-041513 A | 3/2021 | | |
| JP | 2021-146452 A | 9/2021 | | |
| KR | 102796802 B1 * | 4/2025 | | |

OTHER PUBLICATIONS

Zeng et al., "Learning Synergies between Pushing and Grasping with Self-supervised Deep Reinforcement Learning", 2018, 9 pages.

Gupta, M. et al., "Using Manipulation Primitives for Object Sorting in Cluttered Environments", IEEE Transactions on Automation Science and Engineering, IEEE Service Center, New York, NY, US, vol. 12, No. 2, Apr. 1, 2015 (Apr. 1, 2015), pp. 608-614, XP011577509, ISSN: 1545-5955, DOI: 10.1109/TASE.2014.2361346 [retrieved on Apr. 3, 2015].

Japanese Office Action dated Mar. 5, 2025, issued in Japanese Patent Application No. 2021-094490 (with English translation; documents 15 and 16 being cited therein).

Chinese Office Action dated Jul. 15, 2025, issued in Chinese Patent Application No. 202210624403.8 (with English translation: Documents 15 and 16 cited therein).

European Office Action dated Sep. 17, 2025, issued in European Patent Application No. 22177003.5 (Documents 1 and 15-17 being cited therein).

* cited by examiner

HANDLING SYSTEM, TRANSPORT SYSTEM, CONTROL DEVICE, STORAGE MEDIUM, AND HANDLING METHOD

CROSS-REFERENCE TO RELATED APPLICATION(S)

This application is based upon and claims the benefit of priority from Japanese Patent Application No. 2021-094490, filed Jun. 4, 2021; the entire contents of (all of) which are incorporated herein by reference.

FIELD

Embodiments of the present invention relate to a handling system, a transport system, a control device, a non-transitory computer readable storage medium storing a program, and a handling method.

BACKGROUND

Conventionally, a handling device in which an end effector holds a target object is known. For automation of a transfer operation in the field of logistics, it is necessary to be capable of holding target objects with various shapes, sizes, and weights. When these target objects are held using a handling device, many calculation operations are required for the decision of a holding strategy including a holding position, a holding method, the posture of a robot arm, and the like. Depending on the load state of a target object, calculation time required for the decision of a holding strategy may increase.

DETAILED DESCRIPTION

According to an embodiment, there is provided a handling system capable of handling a plurality of objects, the handling system including: a movable arm, a holder, a sensor, and a controller. The holder is attached to the movable arm and is capable of holding the object. The sensor is capable of detecting the object. The controller controls the movable arm and the holder. The controller determines whether or not to change an arrangement of the object before the object is held, on the basis of information acquired from the sensor. In a case where it is determined to change the arrangement of the object, the controller evaluates effectiveness of an arrangement change operation for each object, and decides on an arrangement change operation on the basis of an evaluation result.

Hereinafter, a handling system, a transport system, a control device, a storage medium, and a handling method of the embodiments will be described with reference to the drawings.

In the following description, components having the same or similar functions are denoted by the same reference signs. Redundant description of such components may be omitted. The term "on the basis of XX" mentioned in the present application means "on the basis of at least XX" and also includes a case on the basis of another element in addition to XX. Also, the term "on the basis of XX" is not limited to a case where XX is directly used and includes a case on the basis of a result of performing a calculation operation or processing on XX. "XX" is any element (for example, any information).

First Embodiment

Figure 1:
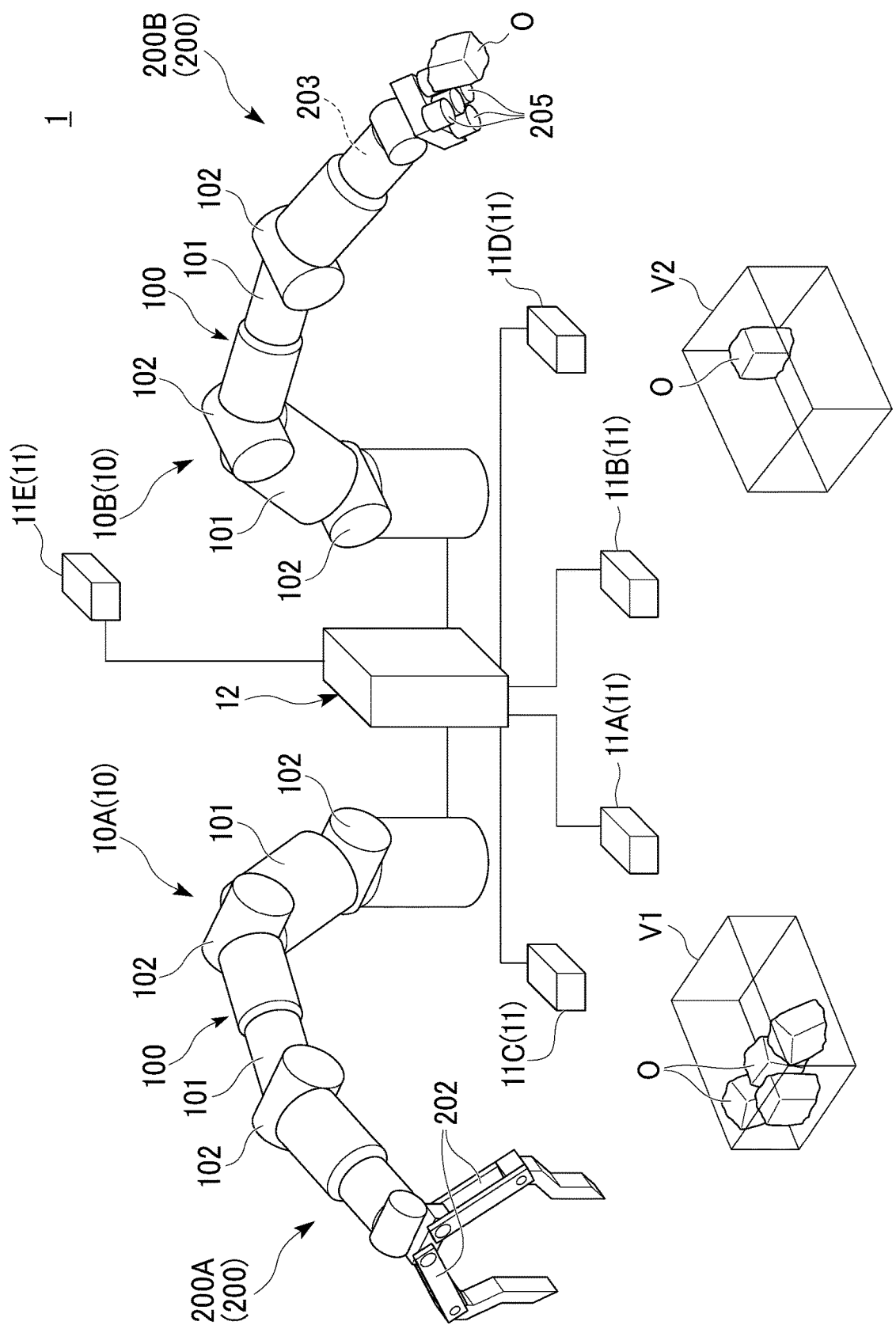
FIG. 1 is a perspective view schematically showing a transport system including a handling system of a first embodiment.

A first embodiment will be described with reference to FIGS. 1 to 13. FIG. 1 is a perspective view schematically showing a transport system 1 including a handling device 10 (an example of a "handling system") of the present embodiment.

The transport system 1 is, for example, a handling system (a picking system) for logistics. The transport system 1 moves an object (a holding target object or a transport target object) O positioned at a movement source V1 to a movement destination V2. For example, the transport system 1 performs work of extracting a designated number of various types of objects O stored in the movement source V1 and the like and loading the objects O on the movement destination V2.

The movement source V1 is, for example, any of various types of conveyors, various types of pallets, a container such as a tote bag or a folding container, or the like. The "container" broadly refers to a member capable of accommodating an object O (for example, a box-shaped member). However, the movement source V1 is not limited to the example described above. In the following description, the "movement source V1" may be referred to as an "extraction source container V1."

Various types of objects O with different sizes and weights are randomly placed on the movement source V1. For example, an object O of a holding target has an uneven shape on at least a part of a surface of the object O. In the present embodiment, there are various types of outer shapes of objects O from a small object of a 5 cm square or the like to a large object of a 30 cm square or the like. Also, there are various types of objects O from a light object of several tens of grains (g) or the like to a heavy object of several kilograms (kg) or the like. However, the size and the weight of the object O are not limited to the examples described above.

The movement destination V2 is, for example, a container such as a tote bag or a folding container. However, the movement destination V2 is not limited to the examples described above. In the following description, the "movement destination V2" may be referred to as a "transport destination container V2" and the "movement source V1" and the "movement destination V2" may be simply collectively referred to as "containers." Also, the transport system 1 may move the object O to a movement destination V2 other than a container.

The transport system 1 is not limited to a handling system for logistics. The transport system 1 can be widely applied to industrial robot systems or other systems. The "transport system," "handling system," and "handling device" mentioned in the present application are not limited to systems and devices whose main purpose is to transport objects, but include systems and devices that transport (move) objects as a part of product assembly or for another purpose.

As shown in FIG. 1, the transport system 1 has a handling device 10, a sensor 11, and a control device 12 (an example of a "controller"). The control device 12 may be incorporated in the handling device 10.

The handling device 10 is, for example, a robot device. The handling device 10 holds the object O positioned in the extraction source container V1 and moves the held object O to the transport destination container V2 (a keeping region). The handling device 10 can communicate with the control device 12 by wire or wirelessly. In the present embodiment, the handling device 10 includes a first handling device 10A and a second handling device 10B.

The first handling device 10A includes, for example, a movable arm 100 and a first holder 200A provided on a tip of the movable arm 100.

The movable arm 100 is a moving mechanism that moves the first holder 200A to a desired position. For example, the movable arm 100 is a six-axis vertical articulated robot arm. The movable arm 100 can take various positions and postures. Like human arms or hands, the movable arm 100 can take a wider variety of postures to hold an object. The movable arm 100 includes, for example, a plurality of arm members 101 and a plurality of rotators 102 in which a plurality of arm members 101 are rotatably connected.

The movable arm 100 may be a three-axis Cartesian robot arm. The movable arm 100 may be a mechanism for moving the first holder 200A to a desired position using other components. For example, the movable arm 100 may be a flying object (for example, a drone) that lifts and moves the first holder 200A using a rotary wing.

The first holder 200A is a holding mechanism (an end effector) that holds the object O positioned in the extraction source container V1. The first holder 200A has a pinching hand 202.

The pinching hand 202 is a gripper-type hand that holds and grips the object O with two fingers, and is provided on a tip of the movable arm 100. A configuration of the pinching hand 202 is not limited to this and may be, for example, a gripper-type hand that holds and grips the object O with three fingers.

The first holder 200A may be a hybrid hand that further has an adsorption device and an adsorber that communicates with the adsorption device, and holds the object O by pinching and/or adsorption. In this case, the adsorber may be provided on a fingertip of the pinching hand 202. A plurality of adsorbers may be provided on the fingertips of the pinching hand 202.

The second handling device 10B has, for example, an arm (a second arm) 100 and a second holder 200B provided on the tip of the movable arm 100. The movable arm 100 of the second handling device 10B has a configuration similar to that of the movable arm 100 of the first handling device 10A.

The second holder 200B is a holding mechanism (an end effector) that holds the object O positioned in the extraction source container V1. For example, the second holder 200B has an adsorption device 203 and an adsorber 205 that communicates with the adsorption device 203. The second holder 200B is an adsorption-type hand that holds the object O by adsorption.

The second holder 200B may also be a mechanism that holds the object O using another holding method. For example, the second holder 200B may be a holder capable of holding the object O with a magnetic force. For example, the second holder 200B may also be a holder (for example, a jamming gripper) including a flexible membrane filled with powder and a vacuum pump that extracts air from the flexible membrane and capable of holding the object O using a jamming phenomenon.

The adsorption device 203 is, for example, a vacuum pump. The adsorption device 203 communicates with each of the plurality of adsorbers 205 via a hose or the like. The adsorption device 203 is driven and therefore the pressure within each adsorber 205 becomes lower than atmospheric pressure and the object O is adsorbed and held by the adsorber 205.

The adsorber 205 is provided on a tip of the second holder 200B. For example, a plurality of adsorbers 205 are provided on the tip of the second holder 200B. The adsorber 205 has an outer shape smaller than the smallest object O positioned in the extraction source container V1. The second handling device 10B adsorbs and holds the object O using only one or more adsorbers 205 selected from the plurality of adsorbers 205.

In the following description, the "first holder 200A" and the "second holder 200B" are collectively referred to as the "holder 200." That is, the "holder 200" includes the "first holder 200A" and the "second holder 200B." Here, the first holder 200A has been described as a pinching-type hand and the second holder 200B has been described as an adsorption-type hand. However, the configuration of the holder 200 is not limited to one provided with one first holder 200A that is a pinching-type hand and one second holder 200B that is an adsorption-type hand as described above. In the present embodiment, a case where both the first holder 200A and the second holder 200B are pinching-type hands or adsorption-type hands is also included. In this case, the holder 200 may be configured to have a plurality of pinching-type hands that are different in at least any one of characteristics such as a configuration, a structure, a shape, a size, and an arrangement. Specifically, for example, the first holder 200A and the second holder 200B may be two or more pinching-type hands having different nail lengths and opening widths. Also, the holder 200 may be configured to have a plurality of adsorption-type hands which are different in at least any one of the characteristics such as a configuration, a structure, a shape, a size, and an arrangement. Specifically, for example, the first holder 200A and the second holder 200B may be two or more adsorption-type hands having different adsorption pad arrangements, adsorption pad diameters, bellows structures, and the like. Even in such cases, it is possible to obtain equivalent effects by performing a similar process in the present embodiment.

The sensor 11 is controlled by the control device 12 and can detect states of a plurality of objects O and/or the holder 200. The sensor 11 includes a first sensor 11A, a second sensor 11B, a third sensor 11C, a fourth sensor 11D, and a fifth sensor 11E. The first sensor 11A, the second sensor 11B, the third sensor 11C, the fourth sensor 11D, and the fifth sensor 11E are connected to the control device 12 by wire or wirelessly. Also, the first to fifth sensors 11A to 11E do not necessarily have to be separate sensors and a specific sensor may independently perform functions of a plurality of sensors among the first to fifth sensors 11A to 11E.

The first sensor 11A is a camera or any of various sensors arranged near the movement source V1 (for example, directly above or diagonally above the movement source V1). The first sensor 11A acquires, for example, information about the object O positioned in the movement source V1 and information about the movement source V1. The information acquired by the first sensor 11A is, for example, "image data," "distance image data," "shape data," and the like. The "distance image data" is image data having distance information in one or more directions (for example, depth information from any reference plane set above the movement source V1). The "shape data" is information indicating an outer shape of the object O and the like. The information detected by the first sensor 11A is output to the control device 12. Also, the first sensor 11A may be provided as a part of the handling device 10.

The second sensor 11B is a camera or any of various sensors arranged near the movement destination container V2 (for example, directly above or diagonally above the movement destination container V2). The second sensor 11B detects, for example, information about the shape of the movement destination container V2 (including shapes of the inner wall surface and the partition) and information about an object O previously placed in the movement destination container V2. The information acquired by the second sensor 11B is, for example, "image data," "distance image data," "shape data," and the like. The information detected by the second sensor 11B is output to the control device 12. The second sensor 11B may be provided as a part of the handling device 10.

The third sensor 11C is any of various sensors provided on the first holder 200A or near the first holder 200A. The third sensor 11C acquires information about physical states of the first holder 200A such as a distortion of the first holder 200A, a pressure applied to the first holder 200A, and a surface state of the first holder 200A. The third sensor 11C includes, for example, one or more physical sensors such as a distortion sensor, a pressure sensor, and a proximity-contact sensor. The third sensor 11C may further acquire physical information of the object O. The information detected by the third sensor 11C is output to the control device 12. The third sensor 11C may be provided as a part of the handling device 10.

The fourth sensor 11D is any of various sensors provided in the second holder 200B or near the second holder 200B. The fourth sensor 11D acquires, for example, information about physical states of the second holder 200B, such as a distortion of the second holder 200B, a pressure applied to the second holder 200B, and a surface state of the second holder 200B. The fourth sensor 11D includes, for example, one or more physical sensors such as a distortion sensor, a pressure sensor, and a proximity-contact sensor. The fourth sensor 11D may further acquire the physical information of the object O. The information detected by the fourth sensor 11D is output to the control device 12. Also, the fourth sensor 11D may be provided as a part of the handling device 10.

The fifth sensor 11E acquires information about a usage status of the holder 200. For example, the fifth sensor 11E detects, for example, a holder 200 currently used or selected for use between the first holder 200A and the second holder 200B (hereinafter, a holder currently used or selected for use may be generically referred to as a "currently selected holder" or simply a "selected holder"). The information detected by the fifth sensor 11E is output to the control device 12. Also, the fifth sensor 11E may be provided as a part of the handling device 10. Also, the currently selected holder 200 may be determined on the basis of other information such as a control history of the handling device 10 instead of the fifth sensor 11E and the information acquired by the third sensor 11C or the fourth sensor 11D. In this case, the fifth sensor 11E can be omitted. Also, in a case where the holder 200 is a hybrid hand capable of performing pinching, adsorption, and both pinching and adsorption, the control device 12 determines, on the basis of information from the fifth sensor 11E or other information, whether the holder 200 is in a state suitable for pinching an object O, in a state suitable for adsorption, or in a state suitable for performing both pinching and adsorption.

The control device 12 manages and controls an entire transport system 1. For example, the control device 12 acquires the information detected by the first to fifth sensors 11A to 11E and controls the handling device 10 on the basis of the acquired information. The control device 12 is, for example, a device that can execute a program (a computer) and includes a processor, a memory, a storage, and the like.

Figure 2:
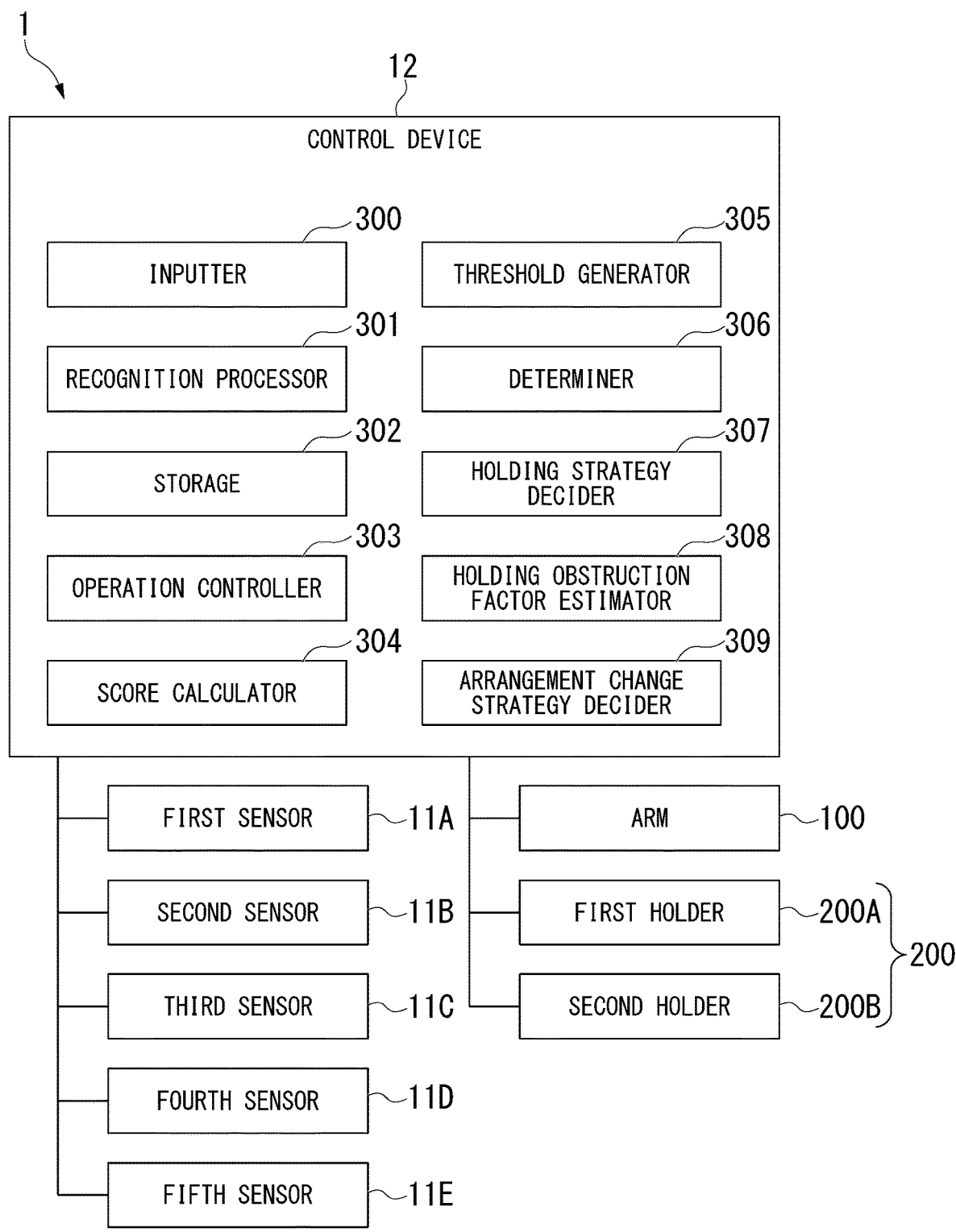
FIG. 2 is a block diagram showing a system configuration of the transport system including the handling system of the first embodiment.
Figure 3:
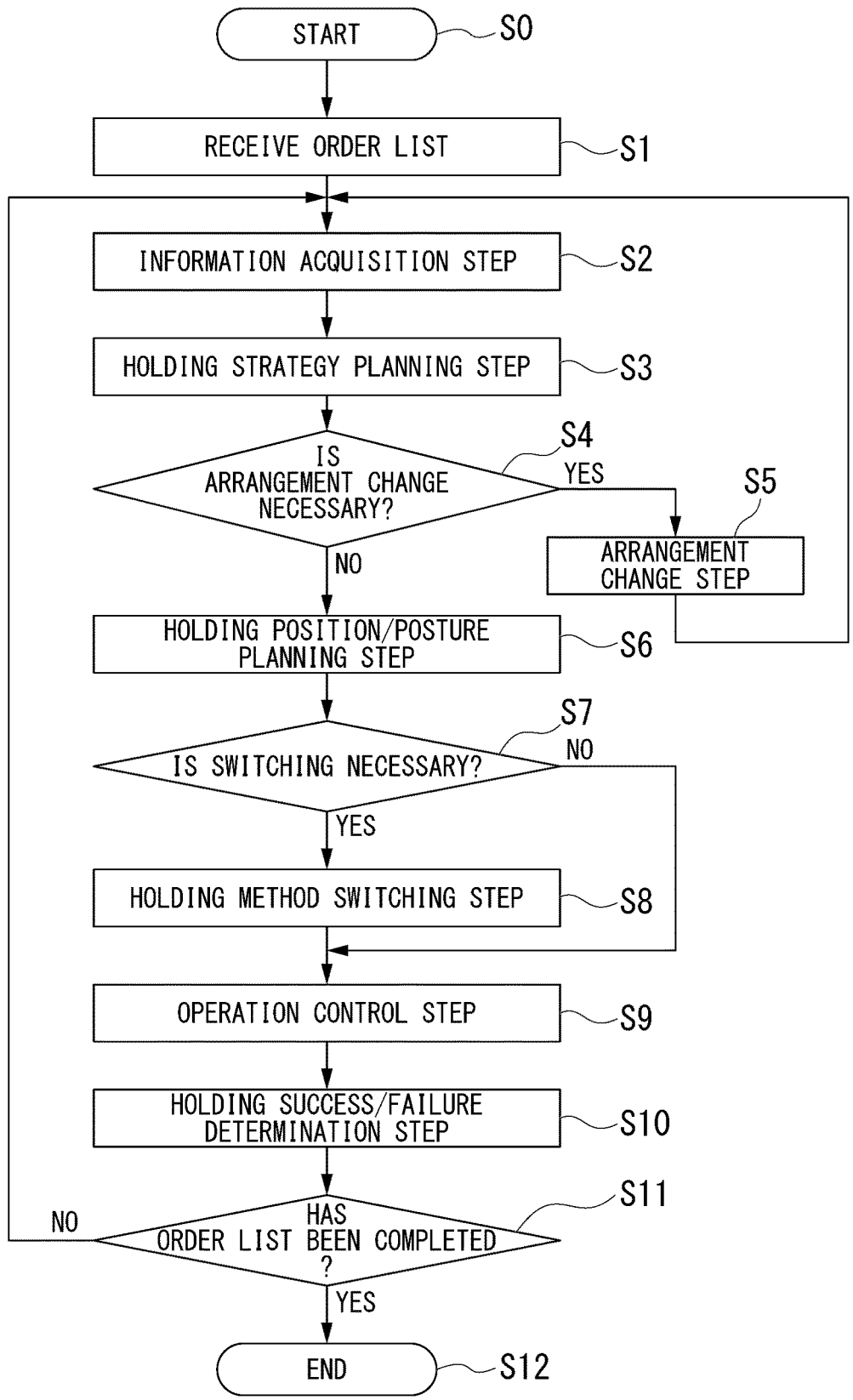
FIG. 3 is a control flowchart for a control device according to the first embodiment.

FIG. 2 is a block diagram showing a system configuration of the transport system 1.

The control device 12 is directly or indirectly connected to the first to fifth sensors 11A to 11E, the movable arm 100, the first holder 200A, and the second holder 200B by wire or wirelessly. The control device 12 includes an inputter 300, a recognition processor 301, a storage 302, an operation controller 303, a score calculator 304, a threshold generator 305, a determiner 306, a holding strategy decider 307, a holding obstruction factor estimator 308, and an arrangement change strategy decider 309.

The inputter 300 receives an order list regarding the object O of the holding target from an operator or a system, information acquired by the first to fifth sensors 11A to 11E, and the like.

The recognition processor 301 processes the information acquired by the first to fifth sensors 11A to 11E. For example, the recognition processor 301 determines the position, posture, shape, characteristics, and the like of the object O in the movement source V1 on the basis of image data acquired by the first sensor 11A.

The storage 302 records a control program for the control device 12, shape data regarding the object O of a picking target, an order list received from an operator or a system, various types of scores generated by the score calculator 304, a threshold generated by the threshold generator 305, a determination result of the determiner 306, a holding strategy decided on by the holding strategy decider 307, a holding obstruction factor estimated by the holding obstruction factor estimator 308, an arrangement change strategy decided on by the arrangement change strategy decider 309, a control history and an operation history of the handling device 10, and the like. Also, shape data stored in the storage 302 is defined in a local coordinate system of the object O.

The operation controller 303 controls operations of the movable arm 100, the first holder 200A, the second holder 200B, and the like of the handling device 10. For example, the operation controller 303 specifically calculates a position for holding the object O and a posture of the movable arm 100 when the object O is held appropriate for holding the specific object O by a specific holding means. The operation controller 303 issues an instruction to the handling device 10 and causes the first holder 200A or the second holder 200B to perform an operation of holding a specific object O on the basis of the calculated position where the object O is held and the posture of the movable arm 100 when the object O is held. Also, the operation controller 303 specifically calculates a position where an arrangement of the object O is changed and a posture of the movable arm 100 when the arrangement is changed appropriate for changing the arrangement of the specific object O using the specific holding means. The operation controller 303 issues an instruction to the handling device 10 and causes the first holder 200A or the second holder 200B to perform an arrangement change operation on the specific object O on the basis of the calculated position where the arrangement of the object O is changed and the calculated posture of the movable arm 100 when the arrangement is changed.

In the present specification, the "arrangement change operation" is a physical operation of changing a spatial arrangement of a specific target object with a physical force. Content of the arrangement change operation is identified according to a target object, a specific force applied to the target object, a means used to apply a force to the target object, a specific mode for changing the spatial arrangement of the target object, and the like.

The score calculator 304 generates a score for deciding on the object O of the holding target, a priority level of the holding method, an object O subject to the arrangement change, effectiveness of the arrangement change operation, or the like. For example, the score calculator 304 calculates a first score, a second score, and a third score to be described below.

The threshold generator 305 generates a threshold for determining whether or not the holding method needs to be switched, whether or not the arrangement needs to be changed, or the like. For example, the threshold generator 305 generates a first threshold for the first score and a second threshold for the second score to be described below.

The determiner 306 determines whether or not the holding method needs to be switched, whether or not the arrangement of the object O needs to be changed, or the like on the basis of a score generated by the score calculator 304, a threshold generated by the threshold generator 305, or the like.

The holding strategy decider 307 decides on a holding strategy including a holding target and a holding method having a high priority level, a sequential order of holding of the holding target, a sequential order of an operation of switching a holding operation and a holding method, and the like on the basis of the score generated by the score calculator 304, the threshold generated by the threshold generator 305, a determination result of the determiner 306, and the like.

The holding obstruction factor estimator 308 estimates the presence or absence of various holding obstruction factors that obstruct the holding of the object O by the holder 200 on the basis of information acquired by the first to fifth sensors 11A to 11E. For example, the holding obstruction factor estimator 308 estimates the presence or absence of a holding obstruction factor on the basis of image data acquired by the first sensor 11A and a recognition result output by the recognition processor 301.

The arrangement change strategy decider 309 decides on an arrangement change strategy for changing the arrangement of the object O so that the object O can be easily held in a case where holding of the object O is difficult on the basis of the score generated by the score calculator 304, the threshold generated by the threshold generator 305, the determination result of the determiner 306, and the like.

All or some functions of the control device 12 are implemented by, for example, one or more processors such as a central processor (CPU) or a graphics processor (GPU) executing a program stored in a program memory. However, all or some of these functions may also be implemented by hardware (for example, a circuit unit; circuitry) such as a large-scale integration (LSI) circuit, an application specific integrated circuit (ASIC), a field-programmable gate array (FPGA), and a programmable logic device (PLD). Also, all or some of the functions described above may be implemented by a combination of software and hardware. The storage 302 is implemented by a flash memory, an electrically erasable programmable read-only memory (EEPROM), a read-only memory (ROM; reading-dedicated memory), a random-access memory (RAM; readable and writable memory), or the like.

Next, an operation of the transport system 1 will be described. The description will be given according to a control flowchart of the control device 12 shown in FIG. 3.

When the control device 12 is activated, the control device 12 starts a process of controlling the handling device 10 after the handling device 10 and the sensor 11 are initialized (step S0). Subsequently, the control device 12 executes step S1.

In step S1, the inputter 300 of the control device 12 receives an order list of an object O of a picking target from an operator or a system (an order list reception step).

Subsequently, the control device 12 executes step S2. In step S2, the inputter 300 of the control device 12 receives image data, distance image data, shape data, and the like regarding an object O of the extraction source container V1 from the first sensor 11A. The recognition processor 301 of the control device 12 determines whether there is an object O in the order list in the extraction source container V1 on the basis of data received by the inputter 300. Also, the recognition processor 301 acquires information about a shape, a position, a posture, and the like of the object O of the picking target on the basis of the data received by the inputter 300 (an information acquisition step).

Figure 4:
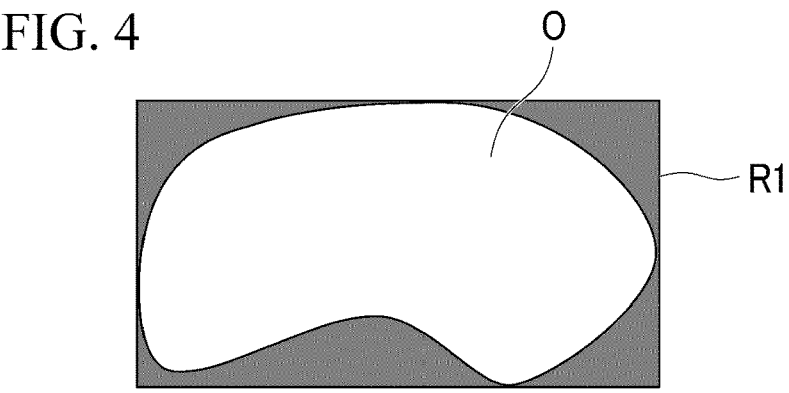
FIG. 4 is a diagram showing a temporary mask region in image data of an object in a case where an object O is held by "pinching."

FIG. 4 is a diagram showing a temporary mask region R1 in the image data of the object O in a case where the object O is held by "pinching."

The recognition processor 301 of the control device 12 sets a rectangular region (a circumscribed rectangular region) circumscribing the object O of the picking target from the image data as the "temporary mask region R1" using a known image segmentation method. The image segmentation may be performed with a method using machine learning.

Figure 5:
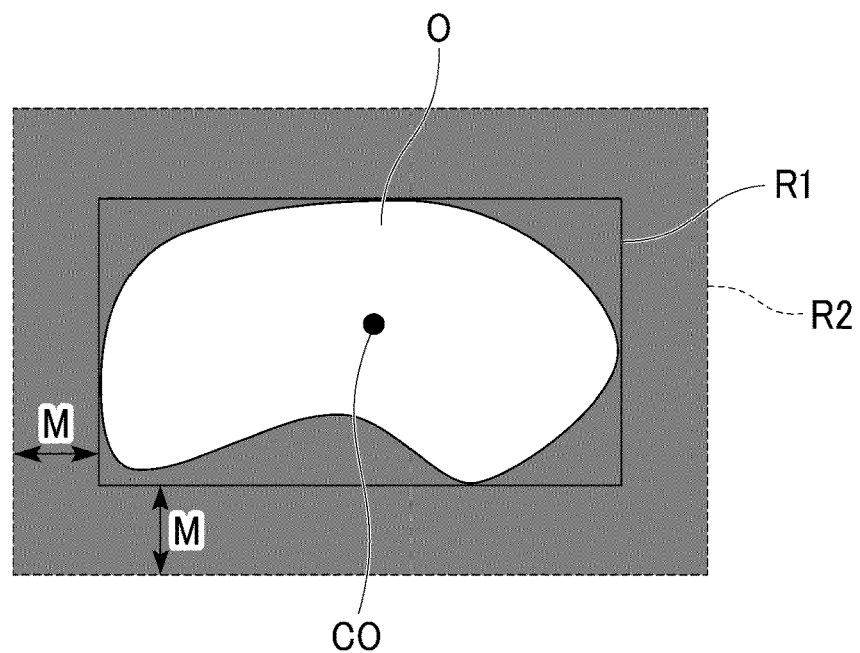
FIG. 5 is a diagram showing a mask region in image data of an object.

FIG. 5 is a diagram showing a mask region R2 in the image data of the object O.

The recognition processor 301 sets a region extended in vertical and horizontal directions of the temporary mask region R1 as the "mask region R2." The mask region R2 is extended by a margin M in vertical and horizontal directions of the circumscribed rectangular region. For example, the margin M is 100 mm. By using the extended mask region R2, the recognition processor 301 can determine whether there is a space where the pinching hand 202 can penetrate the periphery of object O in a case where a holding method of the holder 200 is pinching.

Figure 6:
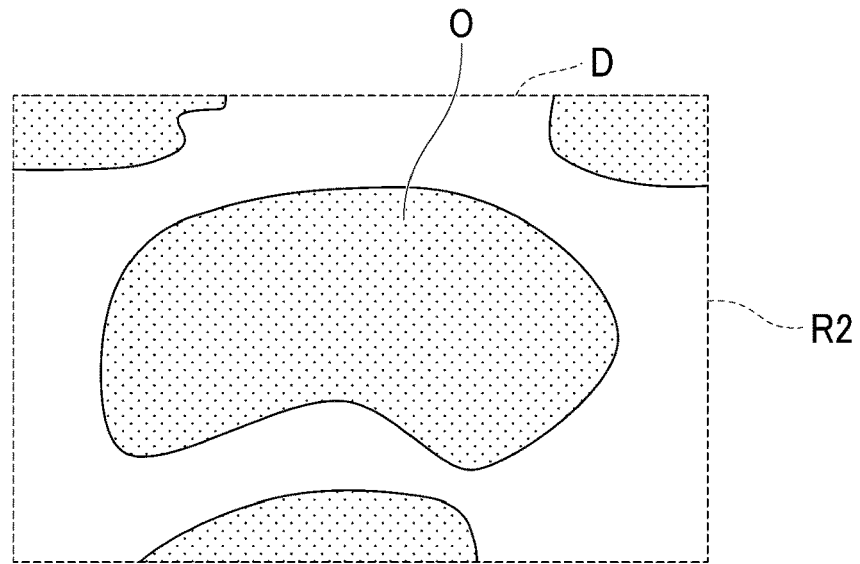
FIG. 6 is a diagram showing a depth image of an object.

FIG. 6 is a diagram showing a depth image D of the object O.

The recognition processor 301 uses distance image data to generate a depth image D by visualizing depth information of the object O in the mask region R2. The depth image D has a height with respect to an origin of a world coordinate system (an X-axis, a Y-axis, and a Z-axis) as a value. A scale of the depth image D can be changed according to a holding method of the holder 200. The scale of the depth image D can be set to, for example, 1 mm per pixel.

Figure 7:
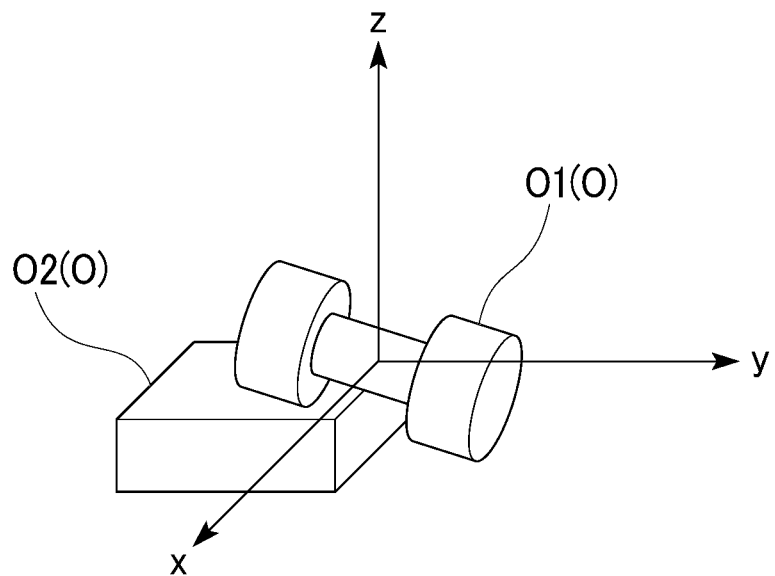
FIG. 7 is a diagram for describing a three-dimensional position and a posture of an object.

FIG. 7 is a diagram for describing a three-dimensional position and a posture of the object O. In FIG. 7, objects O having different shapes are described as "O1" and "O2."

The recognition processor 301 calculates the three-dimensional position and posture of the object O1 from the acquired image data of the object O1. The recognition processor 301 converts the shape data of the object O1 recorded in the storage 302 in a local coordinate system into the world coordinate system (the X-axis, the Y-axis, and the Z-axis) using a transformation matrix. As shown in FIG. 7, a Z-axis direction of the world coordinate system is a depth direction from any reference plane set above the extraction source container V1. The recognition processor 301 calculates the three-dimensional position and posture of the object O1 by comparing the acquired image data of the object O1 with the shape data converted into the world coordinate system.

Figure 8:
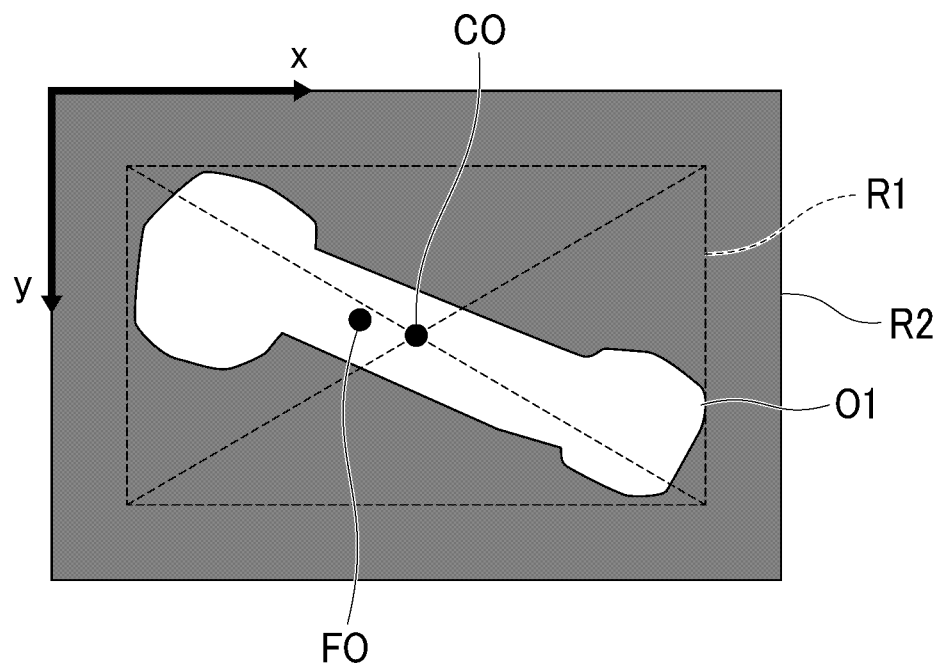
FIG. 8 is a diagram showing a mask region to which information about the three-dimensional position and the posture is added.

FIG. 8 is a diagram showing the mask region R2 to which information about the three-dimensional position and posture is added. The recognition processor 301 sets the three-dimensional position pose serving as a reference of the object O1 as a center CO of a circumscribed rectangular region (the temporary mask region R1) in a mask image R2. Also, the recognition processor 301 may calculate and use a centroid FO of the object O1 separately from the center CO of the circumscribed rectangular region in consideration of the easiness of pinching by the pinching hand 202.

On the other hand, in a case where the object O is held by "adsorption," the temporary mask region R1 is divided into mask planes that can be adsorption targets on a surface of the object O. The recognition processor 301 generates the mask image R2 and the depth image D for each mask plane and defines a direction perpendicular to a mask plane as a normal direction. The recognition processor 301 extracts, for example, a plane region from a point group of a three-dimensional sensor, and sets a minor axis direction as x, sets a major axis direction as y, and sets a normal direction of a plane as z using, for example, principal component analysis, thereby deciding on the position and the posture. Although only one holding region may be defined for one object O in the case of "pinching," there may be a plurality of holding regions for one object O in the case of "adsorption." Therefore, a holding target in "adsorption" may be one region of the object O. For example, in a case where there are a plurality of holding regions of "pinching," the holding target in "pinching" may also be one region of the object O.

In a case where the object O is held by "adsorption," the recognition processor 301 can perform convolution processing for calculating how many adsorbers are used among the plurality of adsorbers 205 at what angle the adsorber 205 is brought into contact with the object O, and the like.

The recognition processor 301 may use a database in which the three-dimensional position, the posture of the object O, and the like have been recorded in a case where picking of the object O has previously succeeded. The recognition processor 301 can also use the database to output a recommended holding method and holding position for the object O.

The inputter 300 receives information about the physical state of the first holder 200A from the third sensor 11C and also receives information about the physical state of the second holder 200B from the fourth sensor 11D, when necessary. Also, the inputter 300 receives information about a usage status of the holder 200 such as a currently selected holder from the fifth sensor 11E, when necessary. The recognition processor 301 determines which of the first holder 200A and the second holder 200B is the currently selected holder 200 on the basis of the information from the fifth sensor 11E and/or other information. The information about physical states of the first holder 200A and the second holder 200B and the information about the currently selected holder 200 may be appropriately acquired at a different timing other than the timing of step S2.

Also, the inputter 300 receives physical information of an object O of a holding target from the database. For example, the inputter 300 can receive information about outer shape information, a weight, a surface material, friction characteristics, and the like of the object O from the database. The database may be defined for each individual object O, or may be used by defining basic information primitives (for example, rectangular parallelepipeds, cylinders, spheres, quadrangular pyramids, or the like), and the like and applying information close to the shape thereto.

Figure 9:
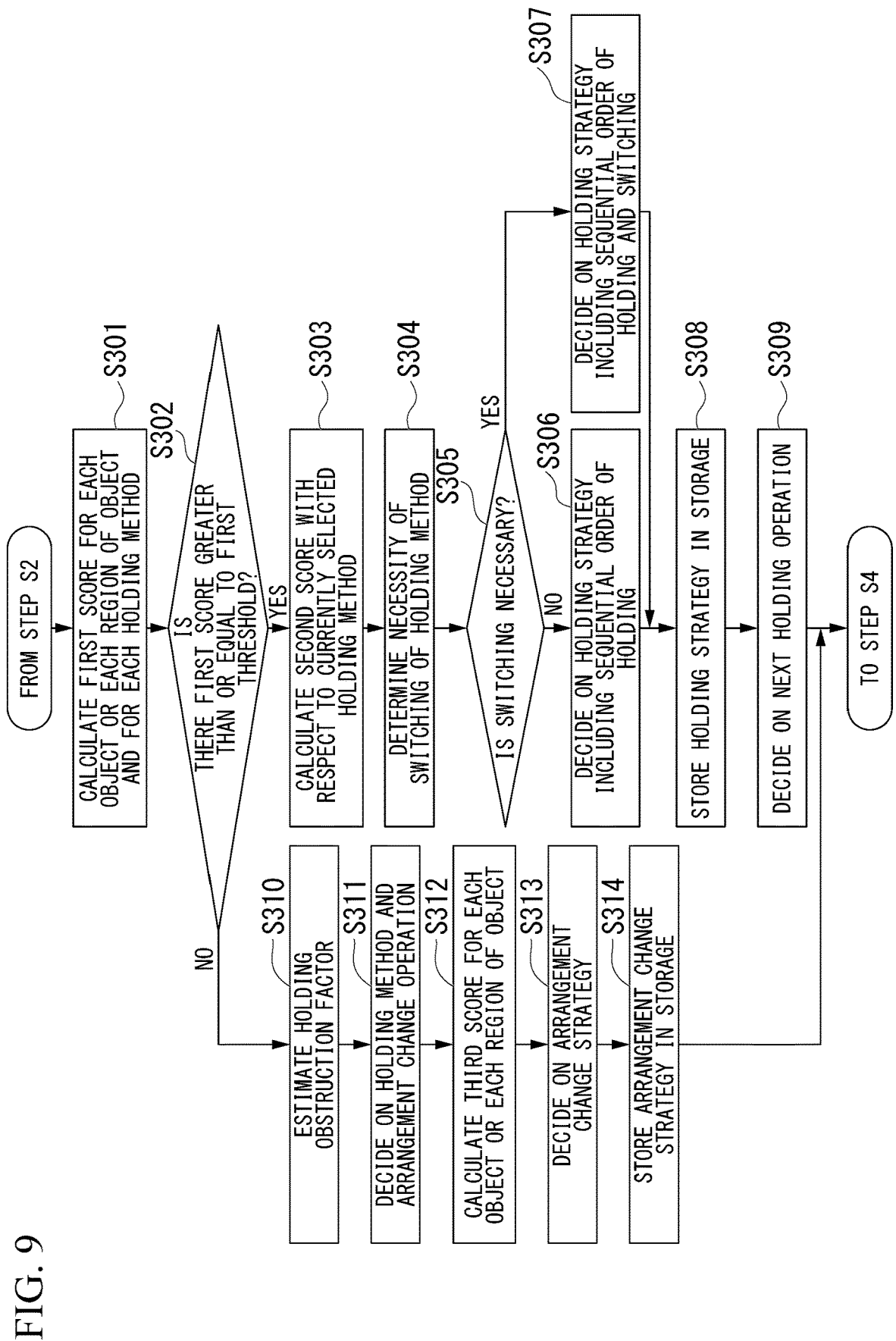
FIG. 9 is a control flowchart of a holding strategy planning step of a control device according to the first embodiment.

Subsequently, the control device 12 executes step S3. In step S3, the control device 12 calculates a score for each object O or each region of the object O and each holding method, and then decides on the next object O to be held and a holding method therefor (a holding strategy planning step). In a case where holding is expected to be difficult, the control device 12 decides on content of an arrangement change operation of the object O. FIG. 9 is a control flowchart of the holding strategy planning step of the control device 12 and shows detailed content of step S3.

In step S301, the score calculator 304 of the control device 12 calculates the easiness of holding when the holder 200 holds the object O as a "first score" on the basis of the information acquired in step S2. The score calculator 304 calculates a first score for (1) each object O or each region of the object O (hereinafter, also simply referred to as "each object O") and (2) each holding method. For example, the holding method is "pinching" by the first handling device 10A or "adsorption" by the second handling device 10B. In a case where the holding method is "pinching," for example, the first score is calculated for each object O. In a case where the holding method is "adsorption," for example, the first score is calculated for each region of the object O.

The first score $S_H(I)$ to be calculated in step S301 is calculated using, for example, an evaluation function shown in Eq. (1).

$$S_H(I) = \sum_i w_{Hi} f_{Hi} = w_{H1} f_{H1} + w_{H2} f_{H2} + w_{H3} f_{H3} + \ldots \quad (1)$$

In Eq. (1), H denotes a holding method (pinching by the first handling device 10A, adsorption by the second handling device 10B, or the like) that is an evaluation target of the first score. 1 denotes the mask region R2 indicating an object O or a region of an object O that is the evaluation target of the first score. $f_{Hi}$ denotes an evaluation item of an evaluation function and $w_{Hi}$ denotes a weight of the evaluation function. That is, the evaluation function described above is represented by a linear combination of evaluation items. However, the evaluation function is not limited to the example described above, an average value may be used for an evaluation item, a non-linear function may be used, and any evaluation function can be used. Also, the evaluation item is not limited to an item described in Eq. (1) and may be, for example, an amount depending on a physical property of the object O or the pinching hand 202.

In a case where the holding method is "pinching" (H=p), a first score $S_p(I)$ is calculated by, for example, an evaluation function shown in Eq. (2).

$$S_p(I) = \sum_i w_{pi} f_{pi} = w_{p1} f_{p1} + w_{p2} f_{p2} + w_{p3} f_{p3} + w_{p4} f_{p4} + w_{p5} f_{p5} + w_{p6} f_{p6} \quad (2)$$

In Eq. (2), $w_{p1}+w_{p2}+w_{p3}+w_{p4}+w_{p5}+w_{p6}=1$, where $w_{pi} \geq 0$ (i=1, 2, 3, 4, 5, 6). $f_{p1}$ denotes a position of an object O (for example, a center position of the object O and a height of the object O). $f_{p2}$ denotes an unevenness ratio of the object O. $f_{p3}$ denotes a flatness of the object O. $f_{p4}$ denotes a difference in depth between the object O and the periphery of the object O. $f_{p5}$ denotes a result of determining whether or not the object O is thin. $f_{p6}$ denotes an evaluation item used in a case where machine learning is used and is obtained by incorporating all evaluation items such as the items $f_{p1}$ to $f_{p5}$ described above. Thus, for example, in a case where $f_{p6}$ is used, the items $w_{p1}$ to $w_{p5}$ may be set to zero. The first score $S_p(I)$ of "pinching" is calculated for various mask regions I indicating each object O.

In a case where the holding method is "adsorption" (H=s), the first score $S_s(I)$ is calculated by, for example, an evaluation function shown in Eq. (3).

$$S_s(I) = \sum_i w_{si} f_{si} = w_{s1} f_{s1} + w_{s2} f_{s2} + w_{s3} f_{s3} + w_{s4} f_{s4} + w_{s5} f_{w5} + w_{s6} f_{s6} \quad (3)$$

In Eq. (3), $w_{s1}+w_{s2}+w_{s3}+w_{s4}+w_{s5}+w_{s6}=1$, where $w_{s1} \geq 0$ (i=1, 2, 3, 4, 5, 6). $f_{s1}$ denotes a position of a region of an object O (for example, a center position of a region of the object O and a height of the object O). $f_{s2}$ denotes an unevenness ratio of the region of the object O. $f_{s3}$ denotes an area of the region of the object O. $f_{s4}$ denotes an approach angle to the region of the object O (for example, an angle formed by a normal direction and a vertical direction of the region of the object O). $f_{s5}$ denotes a result of determining whether or not the object O is thin. $f_{s6}$ denotes an evaluation item to be used in a case where machine learning is used and is obtained by incorporating all the evaluation items such as the items $f_{s1}$ to $f_{s5}$ described above. Thus, for example, in a case where $f_{s6}$ is used, the items $w_{s1}$ to $w_{s5}$ may be set to zero. The first score $S_s(I)$ of "adsorption" is calculated for various mask regions I indicating the region of the object O.

In this way, the score calculator 304 calculates a first score $S_H(I)$ for each object O or each region of an object O and for each holding method (here, pinching by the first handling device 10A and adsorption by the second handling device 10B).

Subsequently, the control device 12 executes step S302. In step S302, the determiner 306 of the control device 12 determines whether or not there is a first score $S_H(I)$ greater than or equal to the certain first threshold Th1 among the first scores $S_H(I)$ calculated in step S301. In a case where it is determined that at least one of the first scores $S_H(I)$ is greater than or equal to the first threshold Th1 (step S302: Yes), the process of the control device 12 proceeds to step S303 so that the holding strategy of the object O is planned. On the other hand, in a case where it is determined that all the first scores $S_H(I)$ calculated for each holding method and for each object O or each region of an object O are less than the first threshold Th1 (step S302: No), the process of the control device 12 proceeds to step S310 so that the arrangement change strategy for easily holding the object O is planned.

In a case where it is determined that the first score $S_H(I)$ greater than or equal to the first threshold Th1 is present in step S302 (step S302: Yes), the control device 12 executes step S303. In step S303, the score calculator 304 of the control device 12 calculates a score as a "second score" with respect to a currently selected holding method on the basis of the information acquired in step S2 and the first score calculated in step S301. The score calculator 304 calculates the second score for (1) each object O or each region of an object O, and (2) each holding method.

The second score $T_{H,H0}(I)$ to be calculated in step S303 is calculated using, for example, an evaluation function shown in Eq. (4).

$$T_{H,H_0}(I) = g(S_H(I), S_{H_0}(I)) = \frac{S_{H_0}(I)}{S_H(I)} \quad (4)$$

In Eq. (4), H denotes a holding method that is an evaluation target of the second score. $H_0$ denotes a currently selected holding method. I denotes the mask region R2 indicating an object O or a region of an object O that is the evaluation target of the second score. That is, the evaluation function of Eq. (4) is a ratio between a first score $S_{H0}(I)$ of the currently selected holding method and the first score $S_H(I)$ of the holding method that is the evaluation target of the second score. However, an evaluation function of the second score is not limited to the example described above and any function can be used. For example, the evaluation function may be any function that depends on the first score $S_{H0}(I)$ of the currently selected holding method $H_0$ and the first score $S_H(I)$ of the holding method that is the evaluation target of the second score.

Because the first score $S_H(I)$ is an index of the "holding easiness" of the target mask region I in a target holding method H, in a case where the evaluation function of Eq. (4) described above is used, the second score $T_{H,H0}(I)$ is a ratio between the holding easiness in the currently selected holding method $H_0$ and the holding easiness in the target holding method H. That is, in a case where the second score of Eq. (4) is greater than 1, holding in the currently selected holding method $H_0$ is easier than holding in the target holding method H. In a case where the second score of Eq. (4) is less than 1, holding in the target holding method H is easier than holding in the currently selected holding method $H_0$. For example, in a case where the second score of Eq. (4) is 0.5, it can be said that the holding easiness in the currently selected holding method $H_0$ is 0.5 times the holding easiness in the target holding method H. That is, it can be said that the holding easiness in the target holding method H is twice the holding easiness in the currently selected holding method $H_0$.

Subsequently, the control device 12 executes step S304. In step S304, the determiner 306 of the control device 12 determines the necessity of switching of the holding method on the basis of the second score $T_{H,H0}(I)$. When the second score $T_{H,H0}(I)$ of Eq. (4) described above is used, for example, the determiner 306 determines that it is necessary to switch the holding method from the currently selected holding method $H_0$ to the target holding method H in a case where a conditional expression of Eq. (5) to be described is satisfied, and determines that it is not necessary to switch the holding method from the currently selected holding method $H_0$ to the target holding method H in a case where the conditional expression of Eq. (5) is not satisfied.

$$T_{H,H_0}(I) = \frac{S_{H_0}(I)}{S_H(I)} < Th2 \tag{5}$$

In Eq. (5), Th2 denotes a certain second threshold generated by the threshold generator 305. That is, the determiner 306 determines that it is necessary to switch the holding method from the currently selected holding method $H_0$ to the target holding method H in a case where the second score $T_{H,H0}(I)$ is less than the second threshold Th2, and determines that it is not necessary to switch the holding method from the currently selected holding method $H_0$ to the target holding method H in a case where the second score $T_{H,H0}(I)$ is greater than or equal to the second threshold Th2.

In a case where a holding method is selected only with the first score $S_H(I)$, because information of the currently selected holding method $H_0$ is not reflected in the first score $S_H(I)$, a holding method with a higher success rate of holding is simply selected. Thus, there is a possibility that it will be determined that it is necessary to switch a holding method every time the object O is held in some cases, and, in such cases, switching of the holding method is likely to be time-consuming. On the other hand, the second score $T_{H,H0}(I)$ is a score that includes information about the currently selected holding method $H_0$ and is calculated on the basis of the currently selected holding method $H_0$. For example, when the second score $T_{H,H0}(I)$ of Eq. (4) described above is used, even if the second score $T_{H,H0}(I)$ is less than 1 (i.e., even if the holding easiness in the target holding method H is greater than the holding easiness in the currently selected holding method $H_0$), the determiner 306 determines that it is not necessary to switch the holding method in a case where the second score $T_{H,H0}(I)$ is not so small (i.e., in a case where it is greater than or equal to the certain second threshold Th2). Thereby, the control device 12 can control the handling device 10 so that holding is performed in the currently selected holding method $H_0$, if at all possible, in a case where holding in the currently selected holding method $H_0$ is reasonably easy.

The determiner 306 may determine the necessity of switching of a holding method on the basis of a magnitude relationship between an average value of second scores $T_{H,H0}(I)$ calculated for each mask region I indicating an object O of a holding target or a region of an object O and the second threshold Th2, and may also determine the necessity of switching of a holding method on the basis of a magnitude relationship between each of the second scores $T_{H,H0}(I)$ for each mask region I and the second threshold Th2. For example, in the example described above, the determiner 306 determines that it is necessary to switch the holding method in a case where at least one of the second scores $T_{H,H0}(I)$ for each mask region I is less than the second threshold Th2.

Next, in a case where it is determined that it is not necessary to switch the holding method (step S305: No), the control device 12 executes step S306. In step S306, the holding strategy decider 307 of the control device 12 decides on a holding strategy including a sequential order in which a plurality of objects O of holding targets are held. In a case where the currently selected holding method $H_0$ is "pinching," the holding strategy decider 307 can, for example, set the sequential order of holding of the objects O as descending order of the first score $S_p(I)$ for "pinching." Also, in a case where the currently selected holding method $H_0$ is "adsorption," the holding strategy decider 307 can set, for example, the sequential order of holding of the objects O as descending order of the first score $S_s(I)$ for "adsorption." That is, the holding strategy decider 307 can decide on a holding strategy in which picking of the objects O is performed in the currently selected holding method $H_0$, for example, in descending order of the first score $S_{H0}(I)$ without switching the currently selected holding method $H_0$.

Subsequently, the control device 12 executes step S308. In step S308, the control device 12 stores a holding strategy including a sequential order of holding decided on by the holding strategy decider 307 in the storage 302 in step S306.

Subsequently, the control device 12 executes step S309. In step S309, the holding strategy decider 307 of the control device 12 decides on the next holding operation. For example, the holding strategy decider 307 sets an earliest holding operation in the holding strategy decided on in step S306 (in the example described above, the currently selected holding method $H_0$ of holding an object O having a highest first score $S_{H0}(I)$) as the next holding operation. Subsequently, the control device 12 proceeds to step S4.

On the other hand, in a case where it is determined that it is necessary to switch the holding method (step S305: Yes), the control device 12 executes step S307. In step S307, the holding strategy decider 307 decides on a holding strategy including a sequential order of holding and a sequential order of switching of a holding method. That is, the holding strategy decider 307 decides on a holding strategy including a sequential order of the holding operation and a sequential order of the operation of switching a holding method for the plurality of objects O of the holding targets. As an example, the holding strategy decider 307 can decide on a sequential order of holding and a sequential order of switching of a holding method as follows.

(1) A holding operation is performed on an object O or a region of an object O for which the first score $S_{H0}(I)$ in the currently selected holding method $H_0$ is greater than the first score $S_{H1}(I)$ in a holding method $H_1$ after switching in descending order of the first score $S_{H0}(I)$.

(2) A holding method is switched from the currently selected holding method $H_0$ to the holding method $H_1$ of a switching destination.

(3) A holding operation is performed on an object O or a region of an object O for which the first score $S_{H0}(I)$ in the currently selected holding method $H_0$ is less than the first score $S_{H1}(I)$ in the holding method $H_1$ after switching in descending order of the first score $S_{H1}(I)$.

Thereby, it is possible to create a holding strategy for picking up all objects O of the holding targets by switching a holding method once and it is possible to minimize the number of times the holding method is switched.

Also, a method of deciding on a holding strategy is not limited to the example described above. For example, the holding strategy decider 307 may decide on a holding strategy for switching the holding method after a holding target whose second score $T_{H1,H0}(I)$ is greater than or equal to the second threshold Th2 is held in the currently selected holding method $H_0$ and holding a holding target whose second score $T_{H,H0}(I)$ is less than the second threshold Th2 in the holding method $H_1$ after switching. The holding strategy decider 307 may decide on a holding strategy in any other methods.

Subsequently, the control device 12 executes step S308. In step S308, the control device 12 stores a holding strategy including a sequential order of holding and a sequential order of switching of a holding method decided on by the holding strategy decider 307 in step S307 in the storage 302.

Subsequently, the control device 12 executes step S309. In step S309, the holding strategy decider 307 of the control device 12 decides on the next holding operation. For example, the holding strategy decider 307 sets the earliest holding operation in the holding strategy decided on in step S307 as the next holding operation. For example, in examples shown in (1) to (3) described above, the holding strategy decider 307 can set an operation of holding an object O or a region of an object O having the maximum first score $S_{H0}(I)$ among objects O or regions of objects O for which the first score $S_{H0}(I)$ in the currently selected holding method $H_0$ is greater than the first score $S_{H1}(I)$ in the holding method $H_1$ after switching in the currently selected holding method $H_0$ as the next holding operation. Also, in a case where there is neither an object O nor a region of an object O for which the first score $S_{H0}(I)$ in the currently selected holding method $H_0$ is greater than the first score $S_{H1}(I)$ in the holding method $H_1$ after switching, the holding strategy decider 307 can set an operation of holding an object O or a region of an object O whose first score $S_{H1}(I)$ in the holding method $H_1$ after switching is maximum in the holding method $H_1$ after switching as the next holding operation. Subsequently, the control device 12 proceeds to step S4.

In the above-described steps, the control device 12 preferably decides on the next holding operation without specifically calculating the position where an object O is held or the posture of the movable arm 100.

Although a case where the control device 12 decides on the entire sequential order of holding and selects the earliest holding operation in the order as the next operation has been described in the example described above, the decision of a sequential order of holding may be omitted and only the next operation may be decided on. For example, the holding strategy decider 307 may select an operation of holding an object O or a region of an object O with the maximum first score $S_H(I)$ as the next operation without deciding on a sequential order of holding in step S306.

When a holding strategy is decided on in step S306 or step S307, the control device 12 may also use a corrected score obtained by correcting the first score $S_H(I)$ or the second score $T_{H,H0}(I)$ using a weight of the object O or the like.

As described above, a calculation standard of the first score $S_H(I)$ may differ depending on a holding method so that an evaluation item for calculating the first score $S_H(I)$ and an assumed holding target (an object O, a region of an object O, or the like) are different between "pinching" and "adsorption." Thus, the control device 12 may perform score normalization as appropriate so that scores in different holding methods can also be compared. The control device 12 may perform a score normalization process in any step such as step S301 of calculating a first score, step S303 of calculating a second score, and step S306 or S307 of deciding on a holding strategy.

Details of the holding strategy planning in step S3 have been described above. Here, an example of calculation using the second score $T_{H,H0}(I)$ of Eq. (4) described above in a case where a selectable holding method is any one of "pinching" and "adsorption," the currently selected holding method $H_0$ is "pinching," and the second threshold Th2 is set to 0.5 is shown in the following Tables 1 to 3 as an example. Tables 1 to 3 are tables showing an example of score calculation. Tables 1 to 3 show a first score indicating the holding easiness in the holding method of "pinching," a first score indicating the holding easiness in the holding method of "adsorption," a second score calculated from these first scores, and determination results based on the second threshold Th2 for holding targets 1 to 5 representing an object O or a region of an object O. In the determination results, "True" indicates that the second score $T_{H,H0}(I)$ is less than the second threshold Th2 (i.e., it is necessary to switch the holding method), and "False" indicates that the second score $T_{H,H0}(I)$ is greater than the second threshold Th2 (i.e., it is not necessary to switch the holding method).

TABLE 1

| Currently selected holding method: Pinching | | Target 1 | Target 2 | Target 3 | Target 4 | Target 5 | Average |
|---|---|---|---|---|---|---|---|
| First score | Pinching | 0.7 | 0.8 | 0.9 | 0.8 | 0.7 | 0.78 |
| | Adsorption | 0.9 | 0.8 | 0.7 | 0.6 | 0.9 | 0.78 |
| Second score | Pinching/Adsorption | 0.78 | 1.00 | 1.29 | 1.33 | 0.78 | 1.03 |
| Second threshold Th2 = 0.5 | | False | False | False | False | False | False |

TABLE 2

| Currently selected holding method: Pinching | | Target 1 | Target 2 | Target 3 | Target 4 | Target 5 | Average |
|---|---|---|---|---|---|---|---|
| First score | Pinching | 0.7 | 0.6 | 0.5 | 0.5 | 0.8 | 0.62 |
| | Adsorption | 0.9 | 0.8 | 0.7 | 0.6 | 0.9 | 0.78 |
| Second score | Pinching/Adsorption | 0.78 | 0.75 | 0.71 | 0.83 | 0.89 | 0.79 |
| Second threshold Th2 = 0.5 | | False | False | False | False | False | False |

TABLE 3

| Currently selected holding method: Pinching | | Target 1 | Target 2 | Target 3 | Target 4 | Target 5 | Average |
|---|---|---|---|---|---|---|---|
| First score | Pinching | 0.4 | 0.2 | 0.2 | 0.1 | 0.7 | 0.32 |
|  | Adsorption | 0.9 | 0.8 | 0.7 | 0.6 | 0.9 | 0.78 |
| Second score | Pinching/Adsorption | 0.44 | 0.25 | 0.29 | 0.17 | 0.78 | 0.38 |
| Second threshold Th2 = 0.5 | | True | True | True | True | False | True |

In the case of an example shown in Table 1, because an average value of the second scores $T_{H,H0}(I)$ of targets 1 to 5 is 1.03 exceeding 1, it can be said that the holding easiness in the currently selected holding method $H_0$ (pinching) averagely exceeds the holding easiness in the holding method (adsorption) of the evaluation target. In addition, because the second scores $T_{H,H0}(I)$ of targets 1 to 5 and an average value thereof all exceed the second threshold Th2=0.5, the determiner 306 of the control device 12 determines that it is not necessary to switch the holding method.

Subsequently, the holding strategy decider 307 decides on a holding strategy so that a sequential order of holding is set in descending order of the first score $S_{H0}(I)$ and holding is performed in order of "target 3→targets 2 and 4→targets 1 and 5" according to "pinching" that is the currently selected holding method. Subsequently, the control device 12 stores the decided holding strategy in the storage 302. Subsequently, the holding strategy decider 307 decides on an operation of "holding target 3 by pinching" that is the earliest holding operation in the holding strategy as the next holding operation. In the example of Table 1, when the first scores Snow of "pinching" for two or more targets are the same value, it is possible to decide on which one is prioritized in the holding strategy as appropriate in consideration of any factor such as the position or the weight of an object O.

In the case of an example shown in Table 2, because the average value of the second scores $T_{H,H0}(I)$ of targets 1 to 5 is 0.79 less than 1, it can be said that the holding easiness in the currently selected holding method $H_0$ (pinching) is averagely less than the holding easiness in the holding method (adsorption) of the evaluation target. However, because the second scores $T_{H,H0}(I)$ of targets 1 to 5 and the average value thereof all exceed the second threshold Th2=0.5, the determiner 306 of the control device 12 determines that it is not necessary to switch the holding method.

Subsequently, as in the case of Table 1, the holding strategy decider 307 decides on a holding strategy so that a sequential order of holding is set in descending order of the first score $S_{H0}(I)$ and holding is performed in order of "target 5→target 1→target 2→targets 3 and 4" by "pinching" that is the currently selected holding method. Subsequently, the control device 12 stores the decided holding strategy in the storage 302. Subsequently, the holding strategy decider 307 decides on an operation of "holding target 5 by pinching" that is the earliest holding operation in the holding strategy as the next holding operation.

In the case of the example shown in Table 3, because the average value of the second scores $T_{H,H0}(I)$ of targets 1 to 5 is 0.38 less than 1, it can be said that the holding easiness in the currently selected holding method $H_0$ (pinching) is averagely less than the holding easiness in the holding method (adsorption) of the evaluation target. Also, because the second scores $T_{H,H0}(I)$ of targets 1 to 4 and the average value thereof are all below the second threshold Th2=0.5, the determiner 306 of the control device 12 determines that it is necessary to switch the holding method.

Subsequently, the holding strategy decider 307 compares magnitudes of the first scores $S_H(I)$ between "pinching" and "adsorption" for targets 1 to 5. In this example, because the first scores $S_H(I)$ in "adsorption" for targets 1 to 5 all exceed the first score $S_{H0}(I)$ in "pinching," which is the currently selected holding method, the holding strategy decider 307 decides on a holding strategy so that the holding method is first switched. Furthermore, the holding strategy decider 307 decides on a holding strategy so that a sequential order of holding after switching of the holding method is set in descending order of the first score $S_H(I)$ by "adsorption" which is a holding method after switching and holding is performed in order of "targets 1 and 5→target 2→target 3→target 4." Subsequently, the control device 12 stores the decided holding strategy in the storage 302. Subsequently, the holding strategy decider 307 decides on an operation of "holding target 1 by adsorption" or an operation of "holding target 5 by adsorption" that is the earliest holding operation in the holding strategy as the next holding operation. Here, because target 1 and target 5 have the same first score $S_H(I)$ in adsorption, it is possible to decide on which one is prioritized as appropriate in consideration of any factors such as positions and/or weights of target 1 and target 5.

A flow of a process of the control device 12 in a case where it is determined that there is a first score $S_H(I)$ greater than or equal to the first threshold Th1 in step S302 has been described above. On the other hand, in a case where it is determined that there is no first score $S_H(I)$ greater than or equal to the first threshold Th1 in step S302 (step S302: No), it is considered that there is no object O in a sufficiently easy-to-hold state. Therefore, instead of planning the holding strategy of steps S303 to S309, the control device 12 executes step S310 so that the arrangement change strategy for easily holding the object O is planned.

In step S310, the holding obstruction factor estimator 308 of the control device 12 estimates the presence or absence of various holding obstruction factors that make it difficult to hold the object O in the extraction source container V1. Examples of holding obstruction factors include a case where the objects O are densely packed in a part of the extraction source container V1, a case where there is an obstacle in front of the object O of the holding target, a case where the object O of the holding target is arranged in a direction unsuitable for holding, a case where the object O of the holding target has a shape unsuitable for holding, and the like.

A process of the holding obstruction factor estimator 308 will be described for an example of the holding obstruction factor indicating that the objects O are densely packed. The holding obstruction factor estimator 308 determines, for example, a degree at which objects O are densely packed within the extraction source container V1 on the basis of image data of the extraction source container V1 acquired by the first sensor 11A. For example, the recognition processor 301 sets a mask region R2 for each object O in the image data acquired by the first sensor 11A and calculates a center CO of the mask region R2 and a centroid FO of the object O (see FIG. 8). Also, the recognition processor 301 calculates a distance between centers CO of mask regions R2 or a distance between centroids FO of objects O as a distance between the objects O. The holding obstruction factor estimator 308 can estimate that the objects O are densely packed in a case where the calculated distance between the objects O (a representative value such as an average value may be used) is less than or equal to a certain threshold. For example, the holding obstruction factor estimator 308 can estimate that the objects O are densely packed in a case where one or more center points CO or FO of other objects O (for example, a plurality of center points CO or FO thereof) are included inside of a circle whose radius from the center point CO or FO of a specific object O is a certain threshold. By performing the density determination in this way, the holding obstruction factor estimator 308 can determine whether or not there is a holding obstruction factor indicating that the objects O are densely packed.

In addition to or in place of the above-described method, the recognition processor 301 can determine whether or not the object O has an elongated shape (when viewed from above) on the basis of an aspect ratio of the mask region R2 corresponding to the object O. For example, in a case where it is determined that a plurality of adjacent objects O have an elongated shape, the holding obstruction factor estimator 308 can estimate that the objects O having small thicknesses are vertically arranged and densely packed. Alternatively, the holding obstruction factor estimator 308 may estimate that the object O is arranged in a direction unsuitable for holding because the object O is placed vertically.

In addition to the above, the holding obstruction factor estimator 308 can estimate the presence or absence of various holding obstruction factors. For example, the holding obstruction factor estimator 308 can estimate that there is an obstacle that obstructs the holding of the object O of the holding target or can estimate that the object O is arranged in a posture unsuitable for holding on the basis of image data of the first sensor 11A.

Subsequently, the control device 12 executes step S311. In step S311, the arrangement change strategy decider 309 of the control device 12 decides on a holding method and an arrangement change operation corresponding to the holding obstruction factor estimated in step S310. For example, in a case where the presence of the holding obstruction factor indicating that the objects O are densely packed is estimated in step S310, the arrangement change strategy decider 309 can select an operation of moving the objects O to eliminate a state in which the objects O are densely packed as the arrangement change operation. The arrangement change strategy decider 309 can select content of a specific arrangement change operation (for example, an operation of pressing the object O, an operation of pulling the object O, an operation of pushing the object O away, an operation of scooping up the object O, or the like) in accordance with a sparse or dense pattern. Also, in a case where the presence of a holding obstruction factor indicating that an obstacle is located on the object O of the holding target is estimated in step S310, the arrangement change strategy decider 309 can select an operation of moving the obstacle as an arrangement change operation. The association between the above-described holding obstruction factor and the above-described arrangement change operation or the holding method to be used may be performed with reference to an association table or database, may be appropriately designated by a user, or may be learned in machine learning. However, at this stage, the object O subject to the arrangement change operation is not decided on. Hereinafter, an example of the holding obstruction factor indicating that the objects O are densely packed will be described below with reference to FIGS. 10 to 13. FIGS. 10 to 13 are schematic diagrams showing an example of the arrangement change operation.

Figure 10:
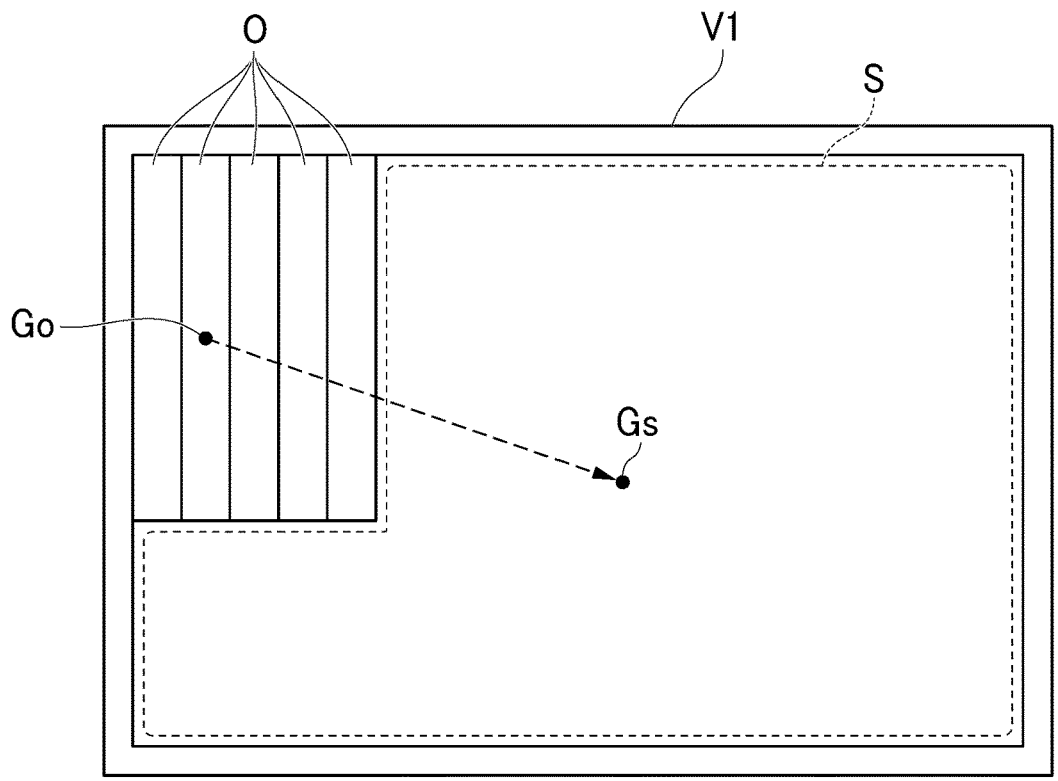
FIG. 10 is a schematic diagram showing an example of an arrangement change operation.

For example, as shown in FIG. 10, in a case where five objects O each having an elongated shape are densely packed in one corner within the extraction source container V1, the arrangement change strategy decider 309 can select an arrangement change operation of moving the object O in a direction from a centroid Go of the object O to a centroid Gs of a region S where there is no object O as an arrangement change operation in which a second object O from the left of FIG. 10 becomes a target. Here, the recognition processor 301 sets a region where a depth is large (i.e., a height in the Z-axis direction of the world coordinate system is small) in the depth image D (see FIG. 6) as the region S where there is no object O.

Figure 11:
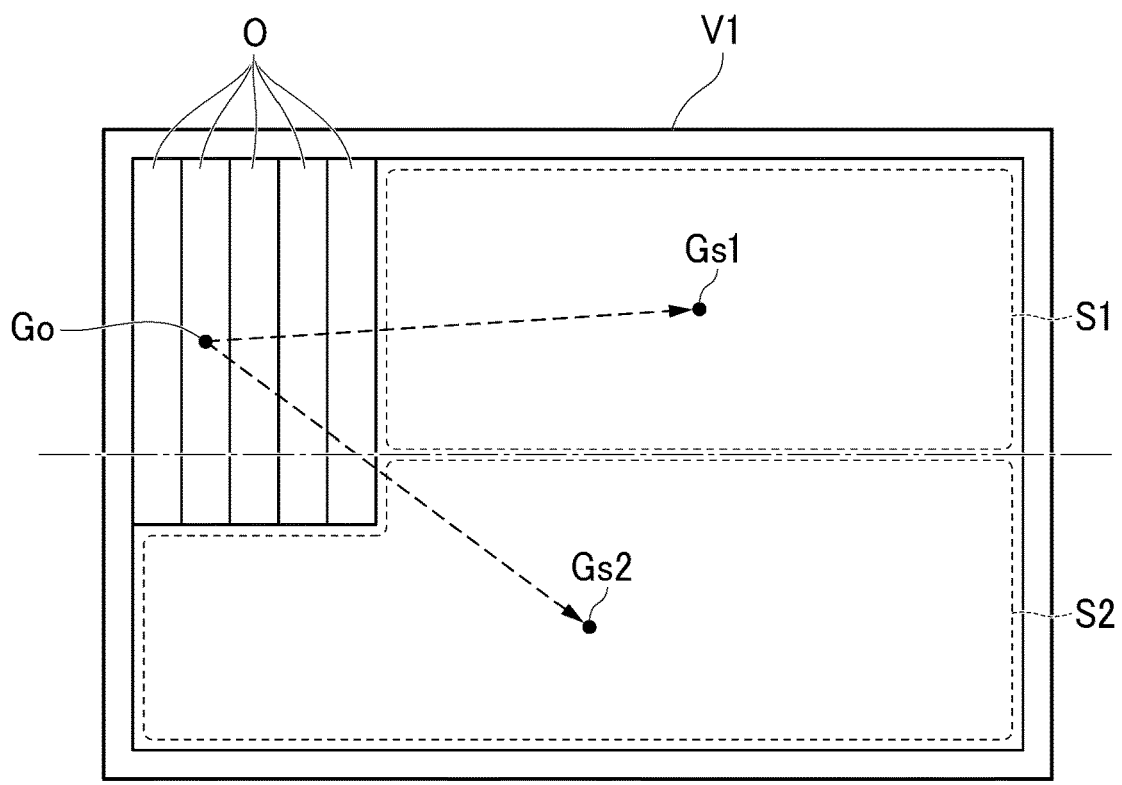
FIG. 11 is a schematic diagram showing an example of an arrangement change operation.

Also, in a process of setting the region S where there is no object O, the recognition processor 301 can also search for a segment region obtained by dividing an internal region of the extraction source container V1 into a plurality of regions instead of searching the entire internal region of the extraction source container V1. For example, as shown in FIG. 11, the recognition processor 301 may vertically divide the entire extraction source container V1 into two segments by a dividing line that is an alternate long and short dash line and search for a region where there is no object O in each of the upper and lower half regions. For the upper half region, a region S1 of FIG. 11 can be set as a region where there is no object O and the arrangement change strategy decider 309 can select an arrangement change operation of moving the object O in a direction from the centroid Go of the object O to a centroid Gs1 of the region S1. On the other hand, for the lower half region, a region S2 of FIG. 11 is set as a region where there is no object O and the arrangement change strategy decider 309 can select an arrangement change operation of moving the object O in a direction from the centroid Go of the object O to a centroid Gs2 of the region S2. In such a dividing process, the adjustment of the selection of the arrangement change operation such as limiting the direction of movement selected for the arrangement change operation to a desired specific region can be performed as necessary. A region dividing method is not limited to the above-described example and any form such as two segments or four segments on the left and right can be adopted.

The arrangement change strategy decider 309 may select the holding method as well as the arrangement change operation in accordance with the estimated holding obstruction factor. For example, the arrangement change strategy decider 309 can decide to perform the arrangement change using the first holder 200A in a case where it is estimated that there is a holding obstruction factor for which the arrangement change by "pinching" is effective. Also, the arrangement change strategy decider 309 can decide to perform the arrangement change using the second holder 200B in a case where it is estimated that there is a holding obstruction factor for which the arrangement change by "adsorption" is effective. Thereby, the arrangement change can be efficiently performed using a holding means most suitable for the decided arrangement change operation. However, the arrangement change strategy decider 309 may select the currently selected holder 200 as the holding method regardless of the estimated holding obstruction factor, and decide on an arrangement change operation under the assumption that the currently selected holder 200 is used. In this case, because the number of times the holding means is switched is reduced, the throughput of the transport system 1 can be improved.

Figure 12:
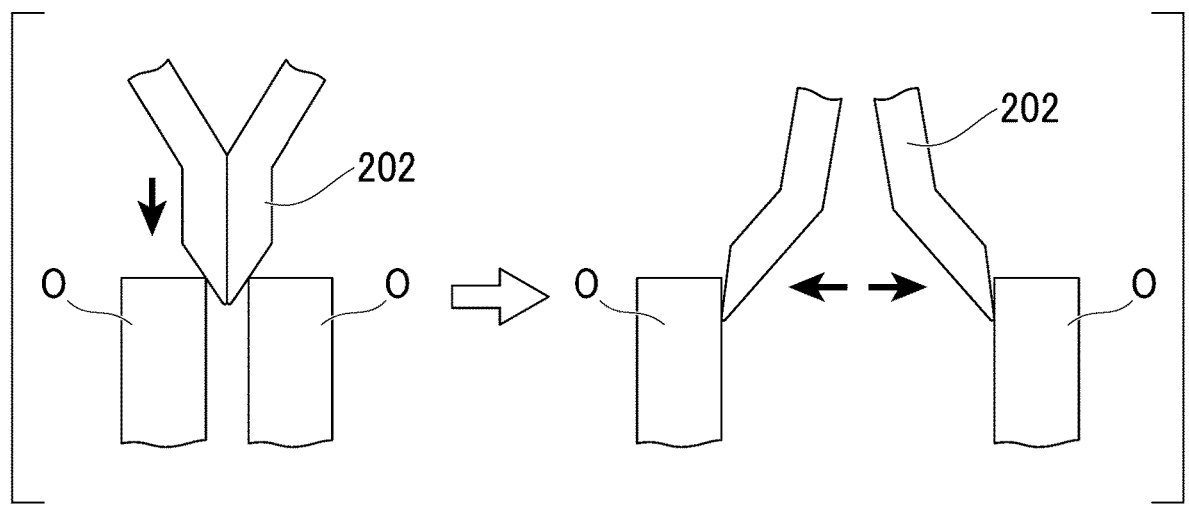
FIG. 12 is a schematic diagram showing an example of an arrangement change operation.

In general, an arrangement change for increasing a distance between objects O is effective in a case where holding by "pinching" is tried, whereas an arrangement change for increasing an area of an adsorbable region of the object O is effective in a case where holding by "adsorption" is tried. The arrangement change operation on the object O by "pinching" can be performed when the distance between objects O is increased by inserting tips of pinching hands 202 between the two objects O and opening the pinching hands 202, for example, as shown in FIG. 12. In addition, it is possible to select various arrangement change operations such as a method of increasing a distance between the objects O by moving the pinching hands 202 in one direction or rotating base shafts of the pinching hands 202 (six shafts in the case of an articulated robot) after the tips of the pinching hands 202 between the two objects O are inserted, a method of moving the object O sideways by moving the pinching hand 202 in a lateral direction in a state in which the tip of the pinching hand 202 comes into contact with the upper surface of the object O, a method of changing an arrangement by slightly lifting and dropping a specific object O with the pinching hand 202, a method of lifting a specific object O with the pinching hand 202 and dropping the specific object O from above another object O, and a method of moving a specific object O so that another object O is brought down in a state in which the specific object O is pinched (for example, dragging the object O while the end of the object O is held). Furthermore, the pinching hand 202 can grip the object O by smoothing the uneven surface of the object O or deform and grip the object O by pressing the object O against the wall.

Figure 13:
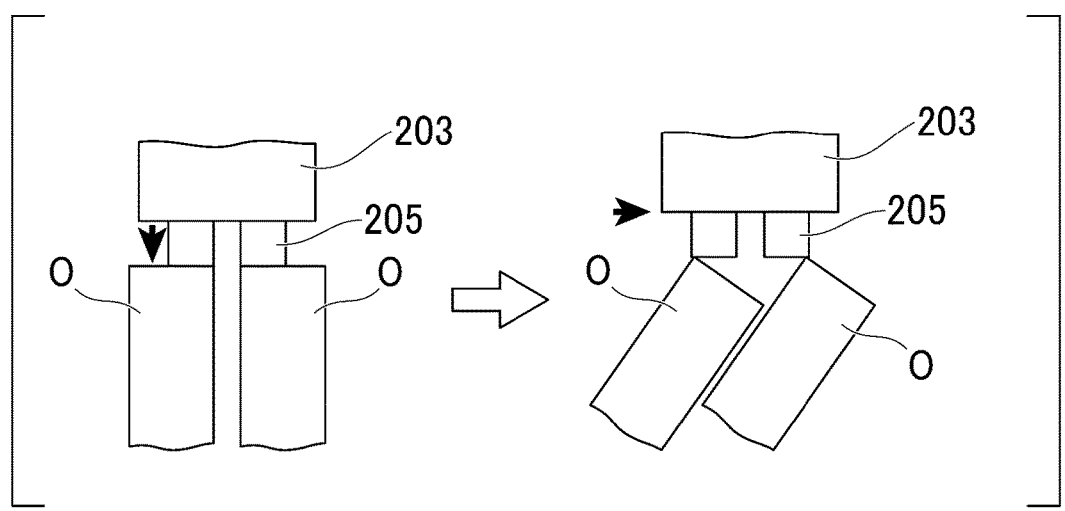
FIG. 13 is a schematic diagram showing an example of an arrangement change operation.

The arrangement change operation on the object O by "adsorption" can be performed by moving the adsorption device 203 in a lateral direction in a state in which the adsorber 205 of the adsorption device 203 is allowed to come into contact with the upper surface of the object O and moving the object O sideways, for example, as shown in FIG. 13. In addition, it is possible to select various arrangement change operations such as a method of rotating the adsorption device 203 in a state in which the adsorber 205 is allowed to come into contact with the object O, a method of lifting a specific object O using the adsorption device 203 and dropping the specific object O from above another object O, and a method of moving a specific object O so that another object O is brought down in a state in which the specific object O has been adsorbed.

Subsequently, the control device 12 executes step S312. In step S312, the score calculator 304 calculates a "third score" as an index of the effectiveness of the arrangement change operation. The score calculator 304 calculates the third score for each object O or each region of an object O on the basis of the holding obstruction factor estimated in step S310 and the holding method and the arrangement change operation decided on in step S311. For example, in a case where a holding obstruction factor indicating that the objects O are densely packed is estimated in step S310 and a process of performing an arrangement change operation of "moving one object O toward a region S where there is no object O" is decided on in a state in which "pinching" is selected as the holding method in step S311, the score calculator 304 calculates the third score indicating the effectiveness of the above-described arrangement change operation for each object O or each region of the object O which can be a holding target. By comparing the third scores, it is possible to select a preferred object O or a preferred region of an object O as the target of the arrangement change operation.

The score calculator 304 can calculate the third score on the basis of, for example, the easiness of the arrangement change operation on the target object O, the difficulty in holding of the target object O, the number of other target objects O whose arrangements are expected to be changed according to the arrangement change operation on a target object O, and the like. The effectiveness of the arrangement change operation can be evaluated to be high when the arrangement change operation on the target object O is easy. In a case where it is difficult to hold the target object O, it is considered that the holding is easily performed due to the arrangement change operation, and therefore the effectiveness of the arrangement change operation can be evaluated to be high. A relationship between the number of objects O whose arrangements are changed at one time in one arrangement change operation and the effectiveness of the arrangement change operation may differ according to a size of the object O or the like. That is, there is an appropriate number in accordance with the size of the object O and the like for the number of objects O whose arrangements are changed at one time according to one arrangement change operation. The effectiveness of the arrangement change operation can be evaluated to be high when the number of objects O whose arrangements are changed is close to the appropriate number. For example, in a case where the object O is small, holding becomes easy due to the changed arrangement normally and the effectiveness of the arrangement change operation increases when the number of objects O whose arrangements are changed at one time increases. On the other hand, in a case where the object O is large, holding may be difficult in contrast if the number of objects O whose arrangements are changed at one time is too large.

The easiness of the arrangement change operation on the object O can be evaluated as in the estimation of the holding obstruction factor in step S310, on the basis of, for example, the arrangement and shape of the object O, the degree at which objects O are densely packed, and the like. The difficulty in holding of the object O can be evaluated to have a negative correlation with the first score, for example, on the basis of an evaluation item similar to the first score indicating the holding easiness. The number of other objects O whose arrangements are expected to be changed in association with the arrangement change operation on the target object O can be evaluated on the basis of, for example, the arrangement of each object O and/or the content of the arrangement change operation.

The score calculator 304 can calculate the third score using an evaluation function represented by a linear combination of evaluation items. However, the evaluation function is not limited to the above-described example and any evaluation function such as a non-linear function can be used. Also, the evaluation item is not limited to the above-described example and may be an amount depending on, for example, the characteristics of the object O, the characteristics of the holder 200 to be used, the characteristics of the selected arrangement change operation, and the like.

Subsequently, the control device 12 executes step S313. In step S313, the arrangement change strategy decider 309 of the control device 12 decides on the arrangement change strategy on the basis of the calculated third score. For example, the arrangement change strategy decider 309 can decide to execute the arrangement change operation decided on in step S311 for the object O or the region of the object O having the maximum third score. As in the holding strategy, the arrangement change strategy decider 309 may sort the objects O or the regions of the objects O in descending order of the third score and decide a sequential order of the arrangement change.

Subsequently, the control device 12 executes step S314. In step S314, the control device 12 stores the arrangement change strategy decided on by the arrangement change strategy decider 309 in the storage 302 in step S313. As described above, the control device 12 can create a strategy for changing the arrangement of the object O in a case where it is determined that holding of the object O is difficult.

Although the third score is calculated in step S312 on the premise of the holding method and the arrangement change operation decided on in step S311 in the above-described example, the calculation of the third score is not limited to this. For example, in step S312, the score calculator 304 can also calculate the third score for each object O or each region of the object O and for each of a plurality of holding methods and/or a plurality of change operations. For example, in a case where the number of objects O or regions of the objects O as the score calculation target is 10, a total of 20 (=10×2) third scores are calculated when the third score is calculated for each of two types of holding methods such as "pinching" and "adsorption." Also, in a case where five types of arrangement change operations such as, for example, (1) an arrangement change operation of "inserting and opening the tips of the holders 200 between the objects O," (2) an arrangement change operation of "inserting the tips of the holders 200 between the objects O and performing movement in one direction," (3) an arrangement change operation of "inserting and rotating the tips of the holders 200 between the objects O," (4) an arrangement change operation of "moving the object O in a lateral direction in a state in which the tip of the holder 200 is allowed to come into contact with the upper surface of the object O," and (5) an arrangement change operation of "lifting and dropping the object O," are specified in advance, the control device 12 can select one or more types of operations as a score calculation target among the above-described arrangement change operations if necessary on the basis of various types of information acquired by the sensor 11 and calculate the third score for each arrangement change operation that has been selected. By selecting an arrangement change operation serving as the score calculation target in accordance with a situation, the calculation time and the load can be reduced as compared with a case where all specified types of arrangement change operations are performed. For example, in a case where the number of objects O or regions of the objects O as the score calculation target is 10, when two types of arrangement change operations are selected as candidates, a total of 20 (=10×2) third scores are calculated. By selecting a highest score among the third scores calculated in this way, it is also possible to decide on a holding method or an arrangement change operation to be adopted as well as the object O of the holding target or the region of the object O on the basis of the third score. In this case, step S310 and/or step S311 may be omitted. The control device 12 may omit the selection of the arrangement change operation and calculate the third scores for all types of arrangement change operations.

As an example of the method of selecting an appropriate arrangement change operation as described above, the control device 12 can use, for example, an evaluation function g(I) shown in the following Eq. (6). g(I) denotes the third score of the arrangement change operation for the mask region I indicating the object O or a region of the object O.

$$g(I) = \mathrm{argmax}(w_1 f_1, w_2 f_2, w_3 f_3, w_4 f_4, w_5 f_5) \quad (6)$$

In Eq. (6), $f_1$ denotes a degree of flexibility of the object O. $f_2$ denotes a surface area of a portion of the object O that is expected not to overlap other objects O (i.e., expected to be exposed) after the arrangement is changed among surface areas of the object O. $f_3$ denotes an aspect ratio of the object O. $f_4$ denotes a difference in height between the object O and its surroundings (inside-outside height). $f_5$ denotes a space margin representing a size of a space in which there are no other objects O and the like in an adjacent region of the object O. $w_1$ to $w_5$ denote weights of functions.

The relationships between the parameters $f_1$ to $f_5$ of the evaluation function g(I) and the above-described arrangement change operations (1) to (5) can be expressed, for example, as shown in the table below. For example, in a case where the $f_1$ component is the maximum in the evaluation function g(I), (1) and (3) are obtained as candidates for the arrangement change operation. In this case, because there are a plurality of candidates, the control device 12 confirms the parameter next to $f_1$. Specifically, the control device 12 compares the parameters $f_3$ and $f_4$ corresponding to (1) or (3), the arrangement change operation (3) is selected in a case where the $f_3$ component is greater than the $f_4$ component in the evaluation function g(I), and the arrangement change operation (1) is selected in a case where the $f_3$ component is less than the $f_4$ component. The control device 12 may omit the comparison process between $f_3$ and $f_4$, calculate third scores for both the arrangement change operations (1) and (3), and select an arrangement change operation with a high third score.

TABLE 4

| Parameter | Evaluation item | Arrangement change operation |
|---|---|---|
| $f_1$ | Degree of flexibility | (1) (3) |
| $f_2$ | Surface area after arrangement change | (2) (4) |
| $f_3$ | Aspect ratio | (3) (4) |
| $f_4$ | Inside-outside height | (1) (2) |
| $f_5$ | Peripheral space margin | (4) |

The control device 12 may execute the arrangement change operation selection process as described above instead of steps S310 and S311. In this case, because the control device 12 can select an appropriate type of arrangement change operation without specifically estimating the holding obstruction factor, the calculation cost can be reduced.

Referring to FIG. 3 again, the control device 12 subsequently executes step S4. In step S4, the determiner 306 of the control device 12 determines whether or not the arrangement change is necessary. The determiner 306 determines that the arrangement change is necessary in a case where it is determined that there is no first score greater than or equal to the first threshold Th1 (step S302: No), and determines that the arrangement change is unnecessary in a case where it is determined that there is a first score greater than or equal to the first threshold Th1 (step S302: Yes). In a case where the determiner 306 determines that the arrangement change is necessary (step S4: Yes), the control device 12 executes step S5.

In step S5, the operation controller 303 of the control device 12 specifically calculates a position where the arrangement change operation is performed on the target object O and a posture of the movable arm 100 for performing the arrangement change operation on the basis of the arrangement change strategy decided on in step S313. The operation controller 303 controls the movable arm 100 and the holder 200 so that the arrangement of the object O is changed on the basis of a calculation result (an arrangement change step). That is, the arrangement change operation is performed on the object O having the maximum third score so that the holder 200 can easily hold the object O. Subsequently, the process of the control device 12 returns to step S2 and the first sensor 11A acquires the state of the extraction source container V1 after the arrangement change as image data. Subsequently, the first score is calculated again in step S301 and the comparison between each first score and the first threshold Th1 is executed in step S302. In this way, the arrangement change operation is iterated until the first scores of one or more objects O are greater than or equal to the first threshold Th1.

On the other hand, in a case where the determiner 306 determines that the arrangement change is not necessary (step S4: No), the control device 12 executes step S6. In step S6, the operation controller 303 of the control device 12 specifically calculates the position for holding the target object O and the posture of the movable arm 100 when the target object O is held decided on in step S3 (a holding position/posture planning step).

When the holding method of the object O selected in step S3 is "pinching," the operation controller 303 of the control device 12 specifically calculates the position where the object O is pinched and the posture of the movable arm 100 at the time of pinching of the object O in a method appropriately selected from known methods in step S6.

In a case where the holding method of the object O selected in step S3 is "adsorption," the operation controller 303 of the control device 12 specifically calculates the position where the object O is adsorbed and the posture of the movable arm 100 at the time of adsorbing of the object O in a method appropriately selected from known methods in step S6.

Also, in the present embodiment, the holding method that can be selected is any one of "pinching" and "adsorption." For example, in a case where "pinching and adsorption (hybrid)" are available, the operation controller 303 of the control device 12 can specifically calculate the position where the object O is pinched and adsorbed and the posture of the movable arm 100 at the time of pinching and adsorbing of the object O in a method appropriately selected from known methods in step S6.

The operation controller 303 calculates whether or not the calculated holding operation can be used as an actual robot operation after calculating the position where the object O is held and the posture of the movable arm 100 at the time of holding of the object O, and calculates the position where the object O is held and the posture of the movable arm 100 at the time of holding of the object O again in a case where it is determined that the holding operation cannot be used as the actual operation. In a case where it is determined that the holding operation cannot be used as the actual operation, the process may be returned to step S3 and restarted from planning of a holding strategy.

The calculation of the position where the object O is held and the posture of the movable arm 100 require a very large amount of calculation. The control device 12 may calculate the position where the object O is held and the posture of the movable arm 100 only for the selected object O. Thus, the transport system 1 can significantly reduce a required amount of calculation as compared with other transport systems that calculate the position where an object O is held and/or the posture of the movable arm 100 for selecting the object O to be held.

Subsequently, the control device 12 executes step S7. In step S7, the determiner 306 of the control device 12 determines whether or not it is necessary to switch the holding method. In a case where the determiner 306 determines that it is necessary to switch the holding method (step S7: Yes), i.e., in a case where a currently selected holding method and a holding method in the next holding operation are different, the control device 12 executes step S8. In step S8, the operation controller 303 switches the holding method (a holding method switching step). For example, in a case where the holding method is switched from "pinching" to "adsorption," the operation controller 303 controls the movable arm 100 of the handling device 10 so that the second holder 200B is directed to the extraction source container V1 instead of the first holder 200A facing the extraction source container V1. On the other hand, in a case where the determiner 306 determines that it is not necessary to switch the holding method (step S7: No), i.e., in a case where a currently selected holding method and a holding method in the next holding operation are the same, the control device 12 proceeds to step S9 without executing step S8.

Subsequently, the control device 12 executes step S9. In step S9, the control device 12 controls the holder 200 and the movable arm 100 on the basis of the position where the object O is held and the posture of the movable arm 100 calculated in step S6 (an operation control step). The selected object O is transported from the extraction source container V1 to the transport destination container V2 by the handling device 10.

Subsequently, the control device 12 executes step S10. In step S10, the control device 12 determines whether or not the holding and/or transportation of the target object O have succeeded (a holding success/failure determination step) on the basis of, for example, image data acquired by the first sensor 11A and/or the second sensor 11B and the like. The control device 12 stores a determination result in the storage 302.

Subsequently, the control device 12 executes step S11. In step S11, the determiner 306 of the control device 12 determines whether or not an order described in an order list has been completed. For example, the determiner 306 determines whether or not the object O remains in the extraction source container V1. In a case where the determiner 306 determines that the object O remains in the extraction source container V1 (step S11: No), the control device 12 executes step S2 again. That is, the control device 12 acquires information about the state of the extraction source container V1 after the object O is picked up, the state of each of the holders 200A and 200B, and the like again, and creates the next holding strategy on the basis of the information. Also, the control device 12 may decide on the next holding operation on the basis of the holding strategy including a sequential order of holding, which is already created, without performing the holding strategy planning step. Also, the control device 12 may correct or update the holding strategy already created on the basis of the acquired information, instead of performing the same holding strategy planning step. Also, the control device 12 may cause the score calculator 304 to change a value of a parameter at the time of score generation or cause the threshold generator 305 to change the first threshold Th1 and/or the second threshold Th2 after one or more holding operations are executed.

On the other hand, in a case where the determiner 306 determines that an order described in an order list has been completed (step S11: Yes), the control device 12 executes step S9 to end the control. For example, in a case where the determiner 306 determines that no object O remains in the extraction source container V1, the control device 12 executes step S9 to end the control.

According to the configuration of the first embodiment as described above, in a case where it is difficult to hold an object, by evaluating the effectiveness of an arrangement change operation on each object or each region of an object that may be subject to the arrangement change, it is possible to improve the holding easiness brought about by the arrangement change operation. Thereby, the operating time of the handling device can be shortened and the throughput of the system can be improved.

Also, in the present embodiment, the control device 12 calculates a score (a third score) of an arrangement change operation on each object O in the evaluation, and selects a target object O whose arrangement is changed on the basis of the score. The score of the arrangement change operation calculated for each object O is calculated on the basis of at least one of the easiness of the arrangement change operation on the target object O, the difficulty in holding of the target object O, and the number of objects O whose arrangements are expected to be changed according to the arrangement change operation on the target object O. Thereby, the object O on which the arrangement change operation is expected to work most effectively can be selected as the target of the arrangement change operation.

Also, in the present embodiment, the control device 12 estimates the holding obstruction factor that obstructs the holding of the object O on the basis of the information acquired from the sensor 11, and decides on an arrangement change operation on the basis of the estimated holding obstruction factor and an evaluation result. Thereby, the arrangement change method can be decided on according to a factor that obstructs the current holding operation, so that the effectiveness of the arrangement change operation can be improved.

Also, in the present embodiment, the control device 12 determines a degree at which objects O are densely packed on the basis of at least one of the arrangement and the shape of the object O, and decides on an arrangement change operation so that the degree at which objects O are densely packed becomes low. Thereby, in a case where it is difficult to hold the object O due to the degree at which objects O are densely packed, the arrangement can be changed to eliminate a state in which objects O are densely packed.

Also, in the present embodiment, the holder 200 is configured to hold the object O by at least one of pinching and adsorption, and the control device 12 decides on an arrangement change operation so that a distance between objects O increases in a case where the holder 200 holds the object O by pinching, and decides on an arrangement change operation so that an adsorbable area of the object O increases in a case where the holder 200 holds the object O by adsorption. Thereby, an appropriate arrangement change operation can be selected in accordance with a type of holding means.

Also, in the present embodiment, the holder 200 can select one or more of the plurality of holding methods to hold the object O, and the control device 12 decides on an object O subject to the arrangement change operation and a holding method of the holder 200 for use in the arrangement change operation on the basis of an evaluation result. Thereby, it is possible to select a holding means that facilitates an effective arrangement change operation.

Also, in the present embodiment, the holder 200 can select one or more of a plurality of holding methods to hold the object O and the holding method currently selected by the holder 200 is used as a holding method of the holder 200 for use in the arrangement change operation. Thereby, it is possible to avoid a change in the currently selected holding method and improve the throughput of the system.

Also in the present embodiment, the control device 12 calculates a score (a first score) of the holding easiness for each object O on the basis of the information acquired from the sensor 11, and determines whether or not to change the arrangement of the object O on the basis of the score of the holding easiness. The control device 12 determines to change the arrangement of the object O in a case where there is no object O whose score of the holding easiness is greater than or equal to a certain threshold (a first threshold). Thereby, in a case where there is an object O recognized to have a certain degree of holding easiness, the holding operation is prioritized over the arrangement change operation and the throughput of the system can be improved.

Also, in the present embodiment, the control device 12 selects one or more types of arrangement change operations among a plurality of types of arrangement change operations on the basis of at least one of the information of the object O and the information acquired from the sensor 11, and evaluates, for the selected types of arrangement change operations, the effectiveness of the arrangement change operation for each object O. The control device 12 selects one or more types of arrangement change operations among a plurality of types of arrangement change operations on the basis of one or more pieces of information selected from the group consisting of a degree of flexibility of the object O, a surface area of a part of the object O that is expected to be exposed after the arrangement change operation, an aspect ratio of the object O, a height difference between the object O and surroundings of the object O, and a size of a space in an adjacent region of the object O. Thereby, the calculation cost can be significantly reduced as compared with the case where the third score is calculated for each object O for all types of arrangement change operations.

Also, in the present embodiment, the control device 12 calculates the position where the decided arrangement change operation is performed and the posture of the movable arm 100 for performing the decided arrangement change operation. Thereby, the control device 12 can create an arrangement change strategy without specifically calculating the position where the arrangement change operation is performed, the posture of the movable arm 100, and the like. It is only necessary for the control device 12 to calculate the position where the arrangement change operation is performed and the posture of the movable arm 100 only for the object O finally selected as the arrangement change subject, significantly reducing the required amount of calculation.

Also, in the present embodiment, the handling device 10 includes the movable arm 100, the holders 200, the sensor 11, and the control device 12. The holder 200 is attached to the movable arm 100 and can select one or more of a plurality of holding methods to hold the object O. The sensor 11 can detect a plurality of objects O. The control device 12 controls the movable arm 100 and the control device 12. The control device 12 calculates a score (a first score) with respect to the selected holding method for each object O and each holding method on the basis of the information acquired from the sensor 11. The control device 12 selects the next object O to be held and a holding method on the basis of the score. The control device 12 calculates a position where the selected object O is held and a posture of the movable arm 100. Thereby, it is possible to efficiently decide on a holding strategy for holding an object O while reducing the number of times the holding method is switched. The control device 12 selects a holding strategy without specifically calculating the position where the object O is held, the posture of the movable arm 100, or the like. A holding strategy is, for example, to select a type of the handling device 10 to be used, an object O to be held, and a holding method. It is only necessary for the control device 12 to calculate the position where an object O is held and the posture of the movable arm 100 only for the selected object O, thereby significantly reducing the required amount of calculation. Also, in a case where holding is reasonably facilitated even in the currently selected holding method, a total working time can be shortened because a period of time required for switching a holding method can be saved by creating a holding strategy so that the currently selected holding method is preferentially used without switching a holding method.

Also, in the present embodiment, a plurality of holding methods include pinching and adsorption. Thereby, the handling device 10 can hold various objects O such as a thin object O that is difficult to be held by pinching and an object O having an uneven shape that is difficult to be held by adsorption.

Also, in the present embodiment, the control device 12 selects an object O to be held and a holding method on the basis of a score so that the number of times the holding method is switched is reduced. Also, the control device 12 determines the necessity (the presence or absence) of switching a holding method on the basis of the score. Thereby, the handling device 10 can execute a series of holding operations so that the number of times the holding method is switched is reduced if at all possible and can reduce a period of time required for entire work.

Also, in the present embodiment, the control device 12 determines the necessity (the presence or absence) of switching a holding method on the basis of a magnitude relationship between a score and a certain second threshold Th2. Thereby, the control device 12 can easily determine the necessity of switching of a holding method. Also, the control device 12 can create a holding strategy according to a situation by adjusting the second threshold Th2.

Also, in the present embodiment, the control device 12 decides on a sequential order of holding of an object O on the basis of the score. Thereby, the control device 12 can select the next holding operation in consideration of entire pick-up work designated in the order list.

Also, in the present embodiment, the control device 12 decides on a sequential order of switching of a holding method of the object. Thereby, the control device 12 can select an optimum timing for switching a holding method in consideration of the entire pick-up work designated in the order list.

Also, in the present embodiment, the control device 12 calculates a score for each region of an object O at the time of score calculation in a case where a holding method is adsorption. Thereby, because the control device 12 can select a region whose holding is easiest within the same object O as a holding target region, holding efficiency can be improved.

Also, in the present embodiment, the control device 12 calculates the holding easiness as a first score for each object O and each holding method, and a score with respect to the selected holding method is a second score calculated on the basis of the first score for each object O and each holding method. Thereby, the control device 12 can decide on a holding operation on the basis of two viewpoints of the holding easiness of an object O represented by the first score and a priority level with respect to a currently selected holding method represented by the second score.

Also, in the present embodiment, a second score for an object O and a holding method is a value obtained by dividing a first score for the object O or a region of the object O and a selected holding method by a first score for the object O or a region of the object O and the holding method. Thereby, the control device 12 can easily calculate a second score for determining the necessity of switching of a holding method.

Second Embodiment

Next, a second embodiment will be described with reference to FIG. 14. The second embodiment is different from the first embodiment in that score calculation is corrected according to the success or failure of holding. Also, configurations other than those described below are similar to those of the first embodiment.

Figure 14:
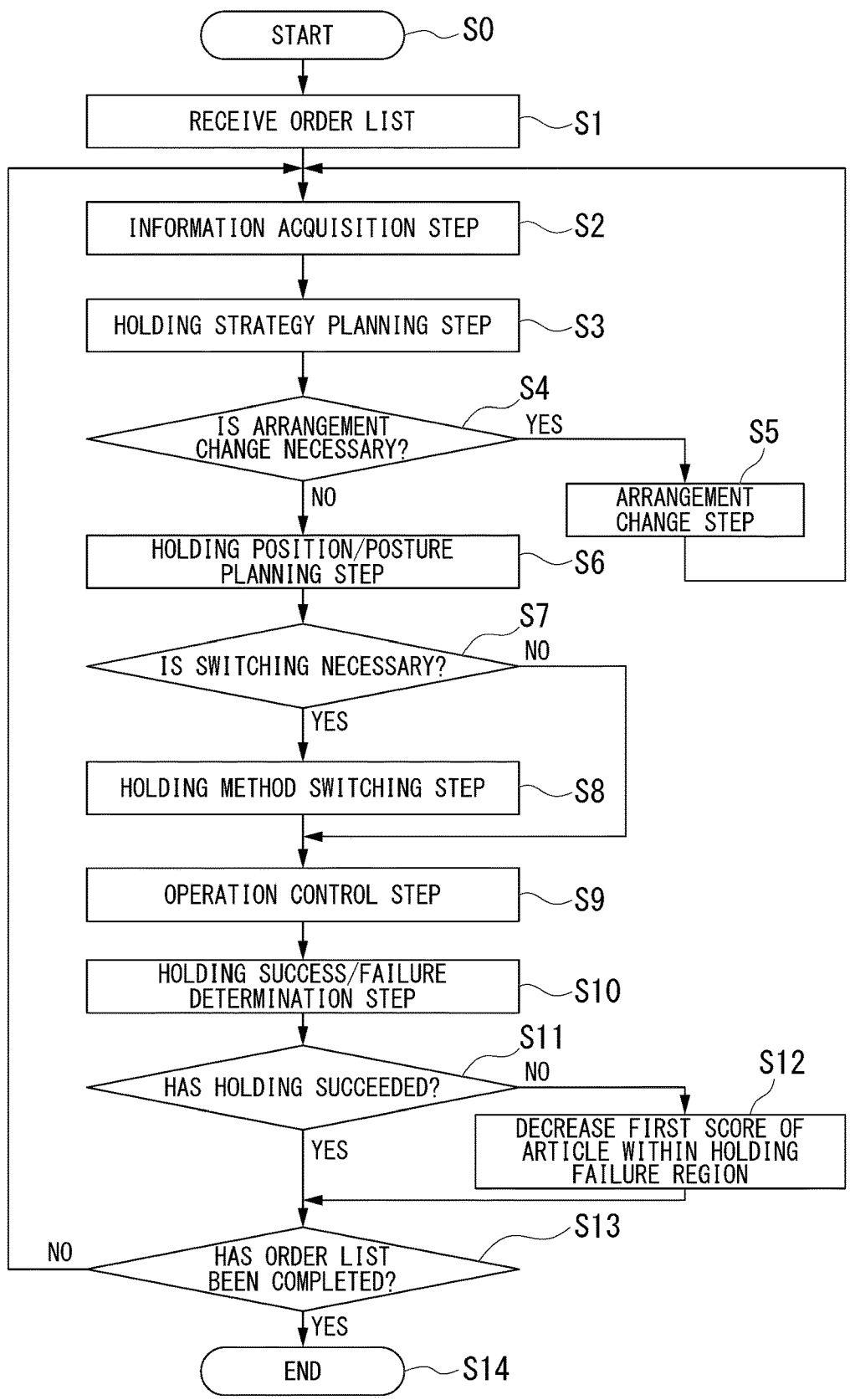
FIG. 14 is a control flowchart according to a control device according to a second embodiment.

FIG. 14 is a control flowchart of a holding strategy planning step of the control device 12 according to the second embodiment.

In the second embodiment, the control device 12 executes steps S11 and S12 after step S10 (a holding success/failure determination step) of the first embodiment. As in the first embodiment, the control device 12 plans a holding strategy or an arrangement change strategy on the basis of an order list and information acquired by the sensor 11, controls the movable arm 100 and the holder 200 so that a holding process or an arrangement change process are performed on the basis of the planned strategy, and determines whether or not the holding of the object O has succeeded in step S10 in a case where the holding process has been performed.

After step S10, in a case where the determiner 306 determines that the holding has succeeded (step S11: Yes), it is determined whether or not the order list has been completed as in the first embodiment (step S13). On the other hand, in a case where the determiner 306 determines that the holding has failed (step S11: No), the control device 12 executes step S12. In step S12, for example, the control device 12 identifies a region where the object O whose holding has failed as a holding failure region with reference to the holding strategy stored in the storage 302 in step S308. The score calculator 304 performs a correction process so that the first score of the object O included in the identified holding failure region becomes small. Also, instead of or in addition to the above-described example, the threshold generator 305 may correct a first threshold Th1.

The holding failure region may be set to include only the object O whose holding has failed and may be set as any shape region such as a circle or a polygon having a certain site centered on the object O whose holding has failed. Alternatively, an internal region of the extraction source container V1 may be divided into a plurality of segment regions in advance and a segment region including the object O whose holding has failed among segment regions may be set as the holding failure region. However, the method of setting the holding failure region is not limited to the above-described example and any method can be adopted.

The correction process of the score calculator 304 may be performed by multiplying the first score calculated as usual by a correction coefficient greater than or equal to 0 and less than 1 or by correcting a parameter of an evaluation function for use in the score calculation of the object O included in the holding failure region, for example, when the first score of the object O included in the holding failure region is calculated next. However, the method of correcting the first score is not limited to the above-described example and any method can be adopted. Also, a correction process may be performed in another step such as the step of calculating a second score instead of the first score so that a priority level of the object O in the holding strategy is corrected.

Subsequently, the control device 12 determines whether or not the order list has been completed as in the first embodiment (step S13).

According to the configuration of the present embodiment, the control device 12 calculates, for each object O, a score (the first or second score) for deciding on the priority level of the holding operation on the basis of information acquired from the sensor 11. In a case where it is determined that the holding operation of the holder 200 has failed, the control device 12 corrects the score for deciding on the priority level on the basis of information of the object O for which the holding operation has failed. Thereby, the control device 12 can appropriately correct the priority level of each object O in the holding strategy in accordance with the success or failure of the holding operation. As a result, it is possible to improve a success rate of the holding operation in the holding strategy by avoiding a situation where the holder 200 repeatedly tries to hold the object O whose holding is difficult.

Third Embodiment

Next, a third embodiment will be described with reference to FIG. 15. The third embodiment is different from the first embodiment in that a plurality of holding strategies are created. Also, configurations other than those described below are similar to those of the first embodiment.

Figure 15:
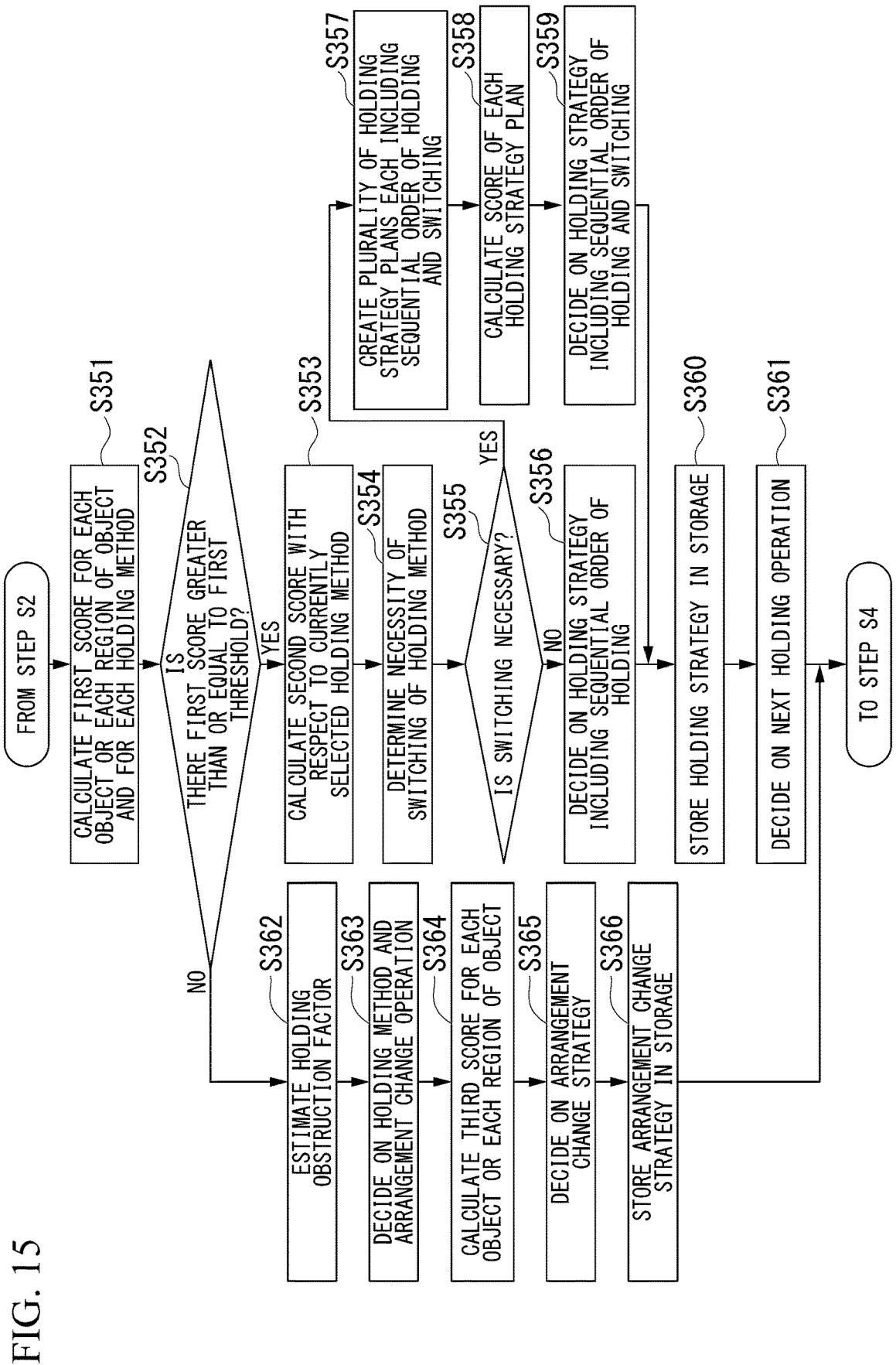
FIG. 15 is a control flowchart of a holding strategy planning step of a control device according to a third embodiment.

FIG. 15 is a control flowchart of a holding strategy planning step of the control device 12 according to the third embodiment.

In the third embodiment, the control device 12 executes steps S357 to S359 instead of step S307 of the first embodiment. In the holding strategy planning step (step S3), the control device 12 calculates a first score $S_H(I)$ (step S351) as in the first embodiment, estimates a holding obstruction factor (step S362) as in the first embodiment in a case where there is no first score $S_H(I)$ greater than or equal to a first threshold Th1 (step S352: No), decides on a holding method and an arrangement change operation (step S363), calculates a third score for each object O or each region of the object O (step S364), decides on an arrangement change strategy (step S365), and stores arrangement change strategy in the storage 302 (step S366). On the other hand, in a case where there is a first score $S_H(I)$ greater than or equal to the first threshold Th1 (step S352: Yes), the control device 12 calculates a second score $T_{H,H0}(I)$ (step S353). The necessity of switching of the holding method is determined (step S354). In a case where the determiner 306 determines that switching of the holding method is unnecessary (S355: No), the holding strategy decider 307 of the control device 12 decides on a holding strategy including a sequential order of holding as in the first embodiment (step S356), the holding strategy is stored in the storage 302 (step S360), and the next holding operation is decided on the basis of the holding strategy (step S361). That is, the control content of the control device 12 in a case where the determiner 306 determines that switching of the holding method is unnecessary is similar to that of the first embodiment.

On the other hand, in a case where the determiner 306 determines that it is necessary to switch the holding method (step S355: Yes), the control device 12 executes step S357. In step S357, the holding strategy decider 307 of the control device 12 creates a plurality of holding strategy plans each including a sequential order of holding and switching. For example, the holding strategy decider 307 creates a holding strategy plan with a relatively low overall success rate in which switching is performed once and a holding strategy plan with a relatively high overall success rate in which switching is performed twice on the basis of the first score $S_H(I)$.

Subsequently, the control device 12 executes step S358. In step S358, the score calculator 304 of the control device 12 calculates a score of each holding strategy plan created by the holding strategy decider 307. For example, the score calculator 304 calculates a score of each holding strategy plan by setting the number of times the holding method is switched in a holding strategy plan, values such as an average value, a maximum value, a minimum value, and the like of the first score $S_H(I)$ for each holding operation, an expected period of time required to complete a holding strategy, and the like as evaluation items. The score calculator 304 can also appropriately change a weight of the evaluation item in accordance with, for example, an input of an operator.

Subsequently, the control device 12 executes step S359. In step S359, the holding strategy decider 307 of the control device 12 decides on an optimum holding strategy on the basis of the score of each holding strategy plan generated by the score calculator 304. For example, the holding strategy decider 307 selects a holding strategy plan having a maximum score as the holding strategy.

Subsequently, the control device 12 stores the holding strategy decided on by the holding strategy decider 307 in the storage 302 (step S360) and decides on the next holding operation on the basis of the holding strategy (step S361).

Also, the control device 12 may omit the calculation of a second score and/or the determination of the necessity of switching (steps S353 to S355) and create a plurality of holding strategy plans on the basis of the first score. For example, the holding strategy decider 307 can create a holding strategy plan with a lowest overall success rate in which switching is not performed, a holding strategy plan with the next lowest overall success rate in which switching is performed once, and a holding strategy plan with a highest overall success rate in which switching is performed twice. The score calculator 304 calculates the score of each holding strategy plan and the holding strategy decider 307 decides on a holding strategy on the basis of this score. Thereby, the control device 12 can decide on a holding strategy for reducing the number of times the holding method is switched without performing the determination of whether to switch the holding method.

According to the configuration of the present embodiment, the control device 12 creates a plurality of holding strategies including at least one of the sequential order of holding of an object O and the sequential order of switching of a holding method and selects one of the plurality of holding strategies. Thereby, the control device 12 can perform a comparison and analysis process for a wide range of holding strategies and select a best holding strategy in terms of a success rate, the number of times the holding method is switched, and the like.

Also, in the present embodiment, the control device 12 selects one of the plurality of holding strategies so that the number of times the holding method is switched is reduced.

Thereby, the handling device 10 can execute a series of holding operations so that the number of times the holding method is switched is reduced if at all possible and can reduce a period of time required for entire work.

Fourth Embodiment

Next, a fourth embodiment will be described. The fourth embodiment is different from the first embodiment in that a holding method is selected on the basis of a frequency of use of each holding method. Also, configurations other than those described below are similar to those of the first embodiment.

The control device 12 records a frequency of use of each holding method in the storage 302. For example, the control device 12 can record a used holding method in the storage 302 every time the holding operation is performed and calculate the frequency of use of each holding method on the basis of a usage history of a holding method. Alternatively, the control device 12 may record information indicating that the holding method has been switched in the storage 302 and calculate the frequency of use of each holding method on the basis of a history of switching of a holding method. Thereby, the control device 12 can check how often each holding method has been used in the past.

The control device 12 can reduce the frequency of use of a frequently used holding method in a case where there is an imbalance in the calculated frequency of use of each holding method or in a case where it is determined that the frequency of use is approaching a usage limit of a holding method. For example, when the second score $T_{H,H0}(I)$ is calculated in step S303 of FIG. 9, the control device 12 can adjust parameters in the second score $T_{H,H0}(I)$ so that a priority level at which the frequently used holding method is selected is lowered. Alternatively, for example, in a case where the second score $T_{H,H0}(I)$ and the second threshold Th2 are compared in step S304 of FIG. 9, the control device 12 can cause the threshold generator 305 to adjust the second threshold Th2 so that the priority level at which the frequently used holding method is selected is lowered. Alternatively, for example, in a case where a holding strategy including the sequential order of holding and switching is decided on in step S307 of FIG. 9, the control device 12 can cause an object O having a reasonably high first score $S_H(I)$ in another holding method to be held in the other holding method so that the frequently used holding method is not used if at all possible. Alternatively, for example, in a case where the score of each holding strategy plan in step S358 of FIG. 15 is calculated, the control device 12 can adjust a parameter in the score so that the priority level at which the frequently used holding method is selected is lowered.

For example, the control device 12 can calculate scores of pinching and adsorption using the following Eq. (7).

$$F(I)=g(w_1h_1S_p(I)+w_2h_2S_s(I))+w_3f_{item} \quad (7)$$

In Eq. (7), $w_1h_1+w_2h_2+w_3=1$, where $w_i \geq 0$ (i=1, 2, 3) and $h_j \geq 0$ (j=1, 2). $S_p(I)$ denotes a first score in a case where a mask region I indicating an object O or a region of an object O is held by "pinching." $S_s(I)$ denotes a first score in a case where the mask region I indicating an object O or a region of an object O is held by "adsorption." $g(S_H(I), S_{H0}(I))$ denotes a function for calculating a second score. $f_{item}$ denotes a value normalized by multiplying a weight of object O by a coefficient. $h_1$ and $h_2$ denote weights that adjust a degree of utilization of a current holding method. For example, hi and $h_2$ can hold their weights in a database or the like as table information as follows. Also, the control device 12 may adjust the weights from a result of calculating the first score $S_p(I)$ or $S_s(I)$.

TABLE 5

| Holding method | $h_1$ | $h_2$ |
|---|---|---|
| Adsorption | 0.9 | 0.1 |
| Pinching | 0.1 | 0.9 |

According to a configuration of the fourth embodiment as described above, the control device 12 selects an object O to be held and a holding method on the basis of the frequency of use of each holding method. Thereby, the control device 12 can limit an imbalance in a specific holding method by making an adjustment for lowering the priority level of a frequently used holding method, so that a lifespan of the holder 200 can be extended.

Also, in the present embodiment, the control device 12 calculates a score on the basis of the frequency of use of each holding method. Alternatively, the control device 12 decides on a second threshold Th2 on the basis of the frequency of use of each holding method, and determines the necessity (the presence of absence) of switching of a holding method on the basis of a magnitude relationship between the score and the second threshold Th2. Thereby, the control device 12 can easily make an adjustment for lowering the priority level of a frequently used holding method by correcting the score or the threshold on the basis of the frequency of use of each holding method.

Fifth Embodiment

Next, a fifth embodiment will be described. The fifth embodiment is different from the first embodiment in that a holding method is selected on the basis of a result of detecting a physical state of each holder 200A or 200B. Also, configurations other than those described below are similar to those of the first embodiment.

The control device 12 receives information about physical states of the first holder 200A and the second holder 200B from the third sensor 11C and the fourth sensor 11D. When a specific holder 200 is used repeatedly, measured values of physical sensors of the third sensor 11C and the fourth sensor 11D can change due to distortion, a shape change, a surface state change, and the like of the holder 200. The control device 12 estimates usage states such as abrasion states of the holders 200A and 200B on the basis of the information about such a physical state. The control device 12 adjusts a score, a threshold, a sequential order of holding and switching in a holding strategy, and the like, for a holding method using the holders 200A and 200B in which the occurrence of deterioration or damage is estimated, so that the priority level or the frequency for selecting the holding method is lowered, as in the fourth embodiment.

According to the configuration of the fifth embodiment as described above, the control device 12 selects an object O to be held and a holding method on the basis of physical information of the holder 200. Thereby, a priority level of a holding method can be adjusted while physical deterioration or the like of the holder 200 is actually measured, so that a lifespan of the holder 200 can be extended.

Sixth Embodiment

Next, a sixth embodiment will be described. The sixth embodiment is different from the first embodiment in that an algorithm using machine learning is used instead of a rule-based algorithm. Also, configurations other than those described below are similar to those of the first embodiment.

In the present embodiment, a process of calculating a first score, a second score, and a third score in the first embodiment can be executed by machine learning. For example, in a case where supervised learning is assumed, the evaluation function defined above can be used as an evaluation value at the time of learning. A learning algorithm is not limited to supervised learning and can be changed according to a type of learning such as unsupervised learning or reinforcement learning.

In relation to switching of a holding method, the control device 12 configures a learning network based on information acquired from the sensor 11, information obtained from a first score, information obtained from a second score, information required for the number of times the holding method is switched, and the like, thereby performing learning compatible with the success rate of a holding operation, the number of times the holding method is switched, and the evaluation of the frequency of use of a holding method and adjusting a balance therebetween. For example, the control device 12 trained by machine learning can receive information acquired in the information acquisition step (step S1) of the sensor 11 as an input, increase the success rate of a holding operation, limit the switching of the holding method, and output one or more holding strategies including scores for each holding target and each holding method and a sequential order of holding and switching suitable for limiting an imbalance of the frequency of use of a holding method and the like.

In a case where machine learning is used, it is assumed that $w_{p1}=w_{p2}=w_{p3}=w_{p4}=w_{p5}=0$ and $w_{s1}=w_{s2}=w_{s3}=w_{s4}=w_{s5}=0$ in an evaluation function of a first score in Eq. (2) and Eq. (3).

Also, in relation to the arrangement change operation, the control device 12 can perform a learning process for optimizing the determination of whether or not to change an arrangement or improving the effectiveness of the arrangement change operation by configuring a learning network on the basis of information acquired from the sensor 11, information obtained from the third score, the success or failure of holding, and the like. For example, the control device 12 trained according to machine learning can receive information acquired in the information acquisition step (step S1) of the sensor 11 as an input and output a third score, an arrangement change strategy, or the like suitable for improving the throughput of the system by improving the determination of whether or not to change an arrangement or the appropriateness of selection of an effective arrangement change operation.

Also, a learning network associated with switching of the holding method and a learning network associated with the arrangement change operation may be integrated into one.

According to the configuration of the sixth embodiment as described above, the control device 12 can efficiently output a more appropriate score, holding strategy, or arrangement change strategy by repeatedly performing machine learning.

Although the control device 12 decides on a sequential order of a holding operation and a switching operation after the necessity of switching is determined by comparing the second score $T_{H,H0}(I)$ with the second threshold Th2 in each of the embodiments described above, a sequential order of a holding operation and a switching operation may be decided on so that the number of switching operations is reduced without the determination of the necessity of switching. For example, with respect to the first score $S_H(I)$ simply indicating the holding easiness in a state in which the currently selected holding method is not considered, the score calculator 304 of the control device 12 may generate the second score $T_{H,H0}(I)$ by correcting (e.g. multiplying by n (n>1)) a value of only the first score $S_{H0}(I)$ for the currently selected holding method $H_0$ and leaving unchanged a value of the first score $S_{HH}(I)$ for other holding methods, and may decide on a holding strategy including a sequential order of a holding operation and a switching operation, on the basis of this second score $T_{H,H0}(I)$, so that the number of switching operations is reduced if at all possible. In this case, the control device 12 does not need to determine the necessity of switching of a holding method. A method of generating the second score $T_{H,H0}(I)$ including a method of correcting the first score $S_H(I)$ is not limited to the example described above, and any method can be used as long as there is any bias so that the currently selected holding method is preferentially used.

Although the handling device 10 includes the first handling device 10A that executes "pinching" and the second handling device 10B that executes "adsorption" in each of the embodiments described above, the configuration of the handling device 10 is not limited thereto and may have one or more holders that execute any holding method as long as one or more of a plurality of holding methods can be selected to hold an object. For example, the handling device 10 may further have another handling device in addition to the first handling device 10A and the second handling device 10B. The handling device 10 may have one hybrid hand capable of executing both "pinching" and "adsorption" instead of the first handling device 10A and the second handling device 10B. Also, at least one of the first handling device 10A and the second handling device 10B may be a hybrid hand capable of executing both "pinching" and "adsorption." Such a hybrid hand may have, for example, a configuration in which a switching process is performed between a pincher and an adsorber by a rotator rotating by 180°, may have a revolver-type configuration such as an optical microscope, or may also have another configuration. The handling device 10 may have two types of handling devices for adsorption, which are different in size, shape, characteristics, and the like. Alternatively, the handling device 10 may have a handling device that holds an object O in a holding method other than pinching and adsorption.

According to at least one embodiment described above, because the effectiveness of an arrangement change operation can be improved, the operating time of the handling device can be shortened and the throughput of the system can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A handling system capable of handling a plurality of objects, the handling system comprising:
   a movable arm;
   a holder attached to the movable arm and capable of holding an object, the holder having a plurality of holding mechanisms which are end effectors independent of each other and being configured to select one or more of a plurality of holding methods to hold the object;

a sensor capable of detecting the object; and a controller configured to control the movable arm and the holder, wherein the controller determines whether or not to change an arrangement of the object before the object is held, on the basis of information acquired from the sensor, and wherein in a case where it is determined to change the arrangement of the object, the controller decides on a holding method and an arrangement change operation in accordance with a holding obstruction factor that obstructs the holding of the object, evaluates effectiveness of the arrangement change operation using the holding method, for each object, and decides on an object subject to the arrangement change operation using the holding method on the basis of an evaluation result, wherein the controller is configured to control the movable arm and the holder to hold and transport the object based on the determination on whether or not to change an arrangement of the object, wherein the controller calculates a score of an arrangement change operation for each object in the evaluation, and selects an object subject to an arrangement change on the basis of the score, and wherein the score of an arrangement change operation for each object is calculated on the basis of at least one of easiness of an arrangement change operation on a target object, difficulty in holding of the target object, and the number of objects whose arrangements are expected to be changed according to the arrangement change operation on the target object.

2. The handling system according to claim 1, wherein the movable arm includes a plurality of movable arms and the holder includes a plurality of holders, each holder attached to each of the movable arms.

3. The handling system according to claim 2, each of the plurality of holders is a different one of the plurality of holding mechanisms.

4. The handling system according to claim 1, wherein the controller estimates a holding obstruction factor that obstructs the holding of the object on the basis of information acquired from the sensor, and decides on an arrangement change operation on the basis of the estimated holding obstruction factor and the evaluation result.

5. The handling system according to claim 1, wherein the controller determines a degree at which the objects are densely packed on the basis of at least one of arrangements and shapes of the objects, and decides on an arrangement change operation so that the degree at which the objects are densely packed is decreased.

6. The handling system according to claim 1, wherein the holder is configured to hold the object by at least one of pinching and adsorption, and wherein the controller decides on an arrangement change operation so that a distance between the objects increases in a case where the holder holds the object by pinching, and decides on an arrangement change operation so that an adsorbable area of the object increases in a case where the holder holds the object by adsorption.

7. The handling system according to claim 1, wherein the controller calculates a score of holding easiness for each object on the basis of information acquired from the sensor, and determines whether or not to change the arrangement of the object on the basis of the score of the holding easiness.

8. The handling system according to claim 7, wherein the controller determines to change the arrangement of the object in a case where there is no object whose score of easiness of the holding is greater than or equal to a certain threshold.

9. The handling system according to claim 1, wherein the controller selects one or more types of arrangement change operations among a plurality of types of arrangement change operations on the basis of at least one of information of the object and information acquired from the sensor, and evaluates, for the selected type of arrangement change operation, effectiveness of the arrangement change operation for each object.

10. The handling system according to claim 9, wherein the controller selects one or more types of arrangement change operations among a plurality of types of arrangement change operations on the basis of one or more pieces of information selected from the group consisting of a degree of flexibility of the object, a surface area of a part of the object that is expected to be exposed after an arrangement change operation, an aspect ratio of the object, a height difference between the object and surroundings of the object, and a size of a space in an adjacent region of the object.

11. The handling system according to claim 1, wherein the controller calculates a position where the decided arrangement change operation is performed and a posture of the movable arm for performing the decided arrangement change operation.

12. The handling system according to claim 1, wherein the controller calculates, for each object, a score for deciding on a priority level of a holding operation on the basis of information acquired from the sensor, and corrects the score for deciding on the priority level on the basis of information of the object on which a holding operation has failed in a case where it is determined that the holding operation of the holder has failed.

13. The handling system according to claim 1, wherein the controller is configured to calculate a score for each object as an indicator of effectiveness of an arrangement change operation in the evaluation, and determines an object subject to an arrangement change on the basis of the score, wherein the calculation of the score includes calculation of an evaluation item indicating difficulty in holding the object including at least one of an unevenness ratio of the object, a flatness of the object, a difference in depth between the object and the periphery of the object, and a result of determining whether or not the object is thin.

14. The handling system according to claim 1, wherein the controller is configured to calculate a score for each object as an indicator of effectiveness of an arrangement change operation in the evaluation, and determines the object subject to an arrangement change on the basis of the score, wherein the calculation of the score includes calculation of an evaluation item indicating difficulty in holding an object, the evaluation item having a negative correlation with the score of holding easiness.

15. A transport system capable of transporting a plurality of objects, the transport system comprising:

a movable arm;

a holder attached to the movable arm and capable of holding an object, the holder having a plurality of holding mechanisms which are end effectors independent of each other and being configured to select one or more of a plurality of holding methods to hold the object;
a sensor capable of detecting the object; and
a controller configured to control the movable arm and the holder,
wherein the controller determines whether or not to change an arrangement of the object before the object is held, on the basis of information acquired from the sensor,
wherein in a case where it is determined to change the arrangement of the object, the controller decides on a holding method and an arrangement change operation in accordance with a holding obstruction factor that obstructs the holding of the object, evaluates effectiveness of the arrangement change operation using the holding method, for each object, and decides on an object subject to the arrangement change operation using the holding method on the basis of an evaluation result, and
wherein in a case where it is determined not to change the arrangement of the object, the controller calculates a position where the object selected as a holding target is held and a posture of the movable arm to cause the object to be moved from a first position to a second position,
wherein the controller is configured to control the movable arm and the holder to hold and transport the object based on the determination on whether or not to change an arrangement of the object,
wherein the controller calculates a score of an arrangement change operation for each object in the evaluation, and selects an object subject to an arrangement change on the basis of the score, and
wherein the score of an arrangement change operation for each object is calculated on the basis of at least one of easiness of an arrangement change operation on a target object, difficulty in holding of the target object, and the number of objects whose arrangements are expected to be changed according to the arrangement change operation on the target object.

16. A control device for controlling a handling system capable of handling a plurality of objects,
wherein the handling system includes
processing circuitry;
a movable arm;
a holder attached to the movable arm and capable of holding an object, the holder having a plurality of holding mechanisms which are end effectors independent of each other and being configured to select one or more of a plurality of holding methods to hold the object; and
a sensor capable of detecting the object,
wherein the processing circuitry determines whether or not to change an arrangement of the object before the object is held, on the basis of information acquired from the sensor, and
wherein in a case where it is determined to change the arrangement of the object, the processing circuitry decides on a holding method and an arrangement change operation in accordance with a holding obstruction factor that obstructs the holding of the object, evaluates effectiveness of the arrangement change operation using the holding method, for each object, and decides on an object subject to the arrangement change operation using the holding method on the basis of an evaluation result,
wherein the processing circuitry is configured to control the movable arm and the holder to hold and transport the object based on the determination on whether or not to change an arrangement of the object,
wherein the processing circuitry calculates a score of an arrangement change operation for each object in the evaluation, and selects an object subject to an arrangement change on the basis of the score, and
wherein the score of an arrangement change operation for each object is calculated on the basis of at least one of easiness of an arrangement change operation on a target object, difficulty in holding of the target object, and the number of objects whose arrangements are expected to be changed according to the arrangement change operation on the target object.

17. A non-transitory computer-readable storage medium storing a program for controlling a handling system capable of handling a plurality of objects,
wherein the handling system includes
a movable arm;
a holder attached to the movable arm and capable of holding an object, the holder having a plurality of holding mechanisms which are end effectors independent of each other and being configured to select one or more of a plurality of holding methods to hold the object;
a sensor capable of detecting the object; and
a controller configured to control the movable arm and the holder, and
wherein the program causes the controller to execute steps of:
determining whether or not to change an arrangement of the object before the object is held, on the basis of information acquired from the sensor, and
in a case where it is determined to change the arrangement of the object, deciding on a holding method and an arrangement change operation in accordance with a holding obstruction factor that obstructs the holding of the object, evaluating effectiveness of the arrangement change operation using the holding method, for each object, and deciding on an object subject to the arrangement change operation using the holding method on the basis of an evaluation result,
wherein the controller is configured to control the movable arm and the holder to hold and transport the object based on the determination on whether or not to change an arrangement of the object,
wherein the controller calculates a score of an arrangement change operation for each object in the evaluation, and selects an object subject to an arrangement change on the basis of the score, and
wherein the score of an arrangement change operation for each object is calculated on the basis of at least one of easiness of an arrangement change operation on a target object, difficulty in holding of the target object, and the number of objects whose arrangements are expected to be changed according to the arrangement change operation on the target object.

18. A handling method for use in a handling system capable of handling a plurality of objects,
wherein the handling system includes
a movable arm;
a holder attached to the movable arm and capable of holding an object, the holder a plurality of holding mechanisms which are end effectors independent of each other and being configured to select one or more of a plurality of holding methods to hold the object;

a sensor capable of detecting the object; and a controller configured to control the movable arm and the holder, and wherein the handling method includes:

determining, by the controller, whether or not to change an arrangement of the object before the object is held, on the basis of information acquired from the sensor, and in a case where the controller determines to change the arrangement of the object, deciding on a holding method and an arrangement change operation in accordance with a holding obstruction factor that obstructs the holding of the object, evaluating, by the controller, the arrangement change operation using the holding method, for each object, and deciding on, by the controller, an object subject to the arrangement change operation using the holding method on the basis of an evaluation result, wherein the method further includes controlling, by the controller, the movable arm and the holder to hold and transport the object based on the determination on whether or not to change an arrangement of the object, wherein the controller calculates a score of an arrangement change operation for each object in the evaluation, and selects an object subject to an arrangement change on the basis of the score, and wherein the score of an arrangement change operation for each object is calculated on the basis of at least one of easiness of an arrangement change operation on a target object, difficulty in holding of the target object, and the number of objects whose arrangements are expected to be changed according to the arrangement change operation on the target object.

* * * * *